US012737085B1

(12) United States Patent
Mahdavipour et al.

(10) Patent No.: US 12,737,085 B1
(45) Date of Patent: Sep. 15, 2026

(54) DEVICES AND METHODS FOR DETECTING INPUT TO A TOUCH-SENSITIVE SURFACE

(71) Applicant: Apple Inc., Cupertino, CA (US)

(72) Inventors: Omid Mahdavipour, San Jose, CA (US); Supratik Datta, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/399,160

(22) Filed: Dec. 28, 2023

Related U.S. Application Data

(60) Provisional application No. 63/492,948, filed on Mar. 29, 2023.

(51) Int. Cl.
*G06F 3/044* (2006.01)
*G06F 3/041* (2006.01)

(52) U.S. Cl.
CPC .......... *G06F 3/044* (2013.01); *G06F 3/04164* (2019.05)

(58) Field of Classification Search
CPC ...... G04G 21/04; G04G 9/0064; G04G 21/08; G04G 9/0082; G04G 21/06; G06F 3/0412; G06F 1/163
See application file for complete search history.

(56) References Cited

U.S. PATENT DOCUMENTS 8,330,727 B2 12/2012 Westerman et al.
9,367,146 B2 6/2016 Piot et al.
10,198,085 B2 2/2019 Bezinge et al.
10,671,222 B2 6/2020 Kuboyama et al.
10,852,876 B2 12/2020 Jamshidi-roudbari et al.
11,650,703 B2 5/2023 Kono et al.
2012/0098781 A1* 4/2012 Kim ...................... G06F 3/0446 29/829
2012/0182233 A1 7/2012 Kim
2013/0154999 A1 6/2013 Guard
2015/0103021 A1 4/2015 Lim et al.
2015/0160760 A1 6/2015 Sato
(Continued)

FOREIGN PATENT DOCUMENTS

JP 7087022 B2 6/2022
KR 20130007311 A * 1/2013 ............. G06F 1/169
WO 2022/246399 A1 11/2022

OTHER PUBLICATIONS

Chub, Alex, "Samsung Galaxy Watch5 Pro and Watch5 Review: Plus Battery Life, Minus Physical Bezel", Available online at: <https://gagadget.com/en/175657-samsung-galaxy-watch5-pro-and-watch5-review-plus-battery-life-minus-physical-bezel/>, [retrieved on Oct. 25, 2022], Oct. 12, 2022, 15 pages.
(Continued)

*Primary Examiner* — Shaheda A Abdin
(74) *Attorney, Agent, or Firm* — Kubota & Basol LLP

(57) ABSTRACT

A plurality of auxiliary electrodes added to an electronic device improves touch detection on a first surface of the electronic device. In some examples, the plurality of auxiliary electrodes are disposed outside of a first dimension of the first surface and non-parallel to the first surface. In some examples, the electronic device is configured to reduce touch detection error caused by a dead-band region of the first surface using the plurality of auxiliary electrodes. In some examples, the electronic device is configured to reduce touch detection error caused by an input provided by an object near an edge of the first surface using the plurality of auxiliary electrodes.

20 Claims, 14 Drawing Sheets

(56) References Cited

U.S. PATENT DOCUMENTS

| | | | | |
|---|---|---|---|---|
| 2016/0231857 | A1* | 8/2016 | Kano | G06F 3/04845 |
| 2016/0291781 | A1 | 10/2016 | He et al. | |
| 2017/0185180 | A1* | 6/2017 | Chae | G06F 3/0446 |
| 2018/0101711 | A1* | 4/2018 | D'Souza | G06V 40/1306 |
| 2019/0073077 | A1 | 3/2019 | Kim et al. | |
| 2020/0210027 | A1 | 7/2020 | Ma et al. | |
| 2020/0266246 | A1* | 8/2020 | Bok | G06F 3/0412 |
| 2025/0265789 | A1 | 8/2025 | Hollands et al. | |
| 2025/0306720 | A1 | 10/2025 | Hollands et al. | |

OTHER PUBLICATIONS

Non-Final Office Action received for U.S. Appl. No. 19/020,519, mailed on Oct. 31, 2025, 20 pages.
International Search Report received for PCT Application No. PCT/US2025/016086, mailed on May 22, 2025, 5 pages.
DJI, "DJI RS 3 PRO User Manual", Jun. 29, 2022, Retrieved from the Internet: URL: https://dl.djicdn.com/downloads/DJI_RS_3_Pro/DJI_RS_3_Pro_User_Manual_v1.0_EN.pdf, 38 pages.

* cited by examiner

Receive, via a touch controller, one or more signals from a plurality of touch-node electrodes disposed beneath and parallel to a first surface and one or more signals from a plurality of auxiliary electrodes disposed outside of a first dimension of the first surface and not parallel to the first surface

802

Detect, via a touch processor, movement of an object relative to the first surface along the direction of the first dimension based on the one or more signals received from the plurality of touch-node electrodes and the one or more signals received from the plurality of auxiliary electrodes

804

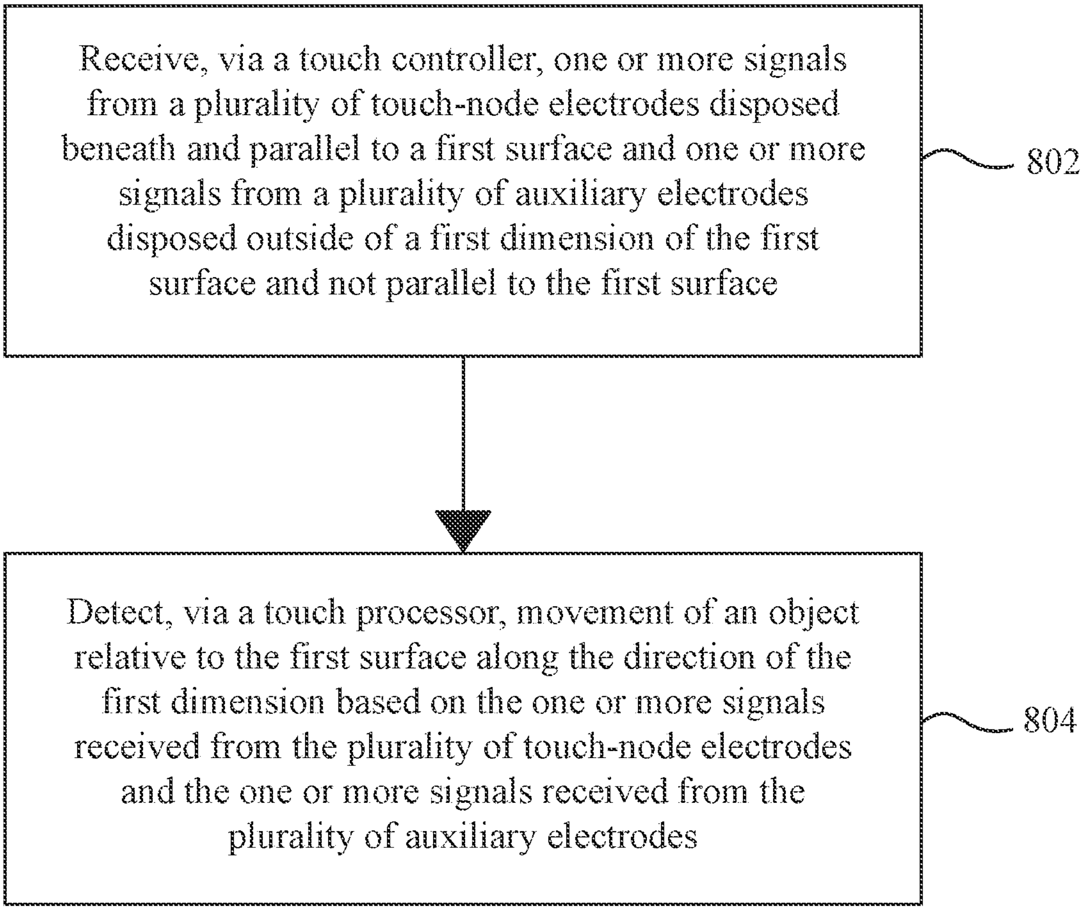

FIG. 8

DEVICES AND METHODS FOR DETECTING INPUT TO A TOUCH-SENSITIVE SURFACE

CROSS-REFERENCE TO RELATED APPLICATIONS

This application claims the benefit of U.S. Provisional Application No. 63/492,948, filed Mar. 29, 2023, the content of which is incorporated herein by reference in its entirety for all purposes.

FIELD OF THE DISCLOSURE

This relates generally to electronic devices and methods for detecting an input provided by an object to a touch-sensitive surface.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch-sensing systems, a physical touch on the display is not needed to detect a touch. For example, in some capacitive-type touch-sensing systems, fringing electrical fields used to detect touch can extend beyond the surface of the display, and objects approaching near the surface may be detected near the surface without actually touching the surface. In some examples, a touch screen or touch sensor panel can detect touches by or proximity of multiple objects (e.g., one or more fingers or other touch objects), and such interactions can be used to perform various inputs using multiple objects. Such a touch screen or touch sensor panel may be referred to as a "multi-touch" touch screen or touch sensor panel, and may accept "multi-touch gestures" as inputs.

Capacitive touch sensor panels can be formed by a matrix of transparent, semi-transparent or non-transparent conductive plates made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). In some implementations, due in part to their substantial transparency, some capacitive touch sensor panels can be overlaid on a display to form a touch screen, as described above. Some touch screens can be formed by at least partially integrating touch-sensing circuitry into a display pixel stackup (i.e., the stacked material layers forming the display pixels).

SUMMARY OF THE DISCLOSURE

Some examples of the disclosure relate to an electronic device that includes one or more auxiliary electrodes to improve touch detection on a first surface of the electronic device. In some examples, the electronic device includes a housing comprising the first surface. In some examples, the first surface includes a first dimension (e.g., a first width). In some examples, the first dimension is less than 25 mm. In some examples, a plurality of touch-node electrodes are disposed beneath and parallel to the first surface. In some examples, a plurality of auxiliary electrodes are disposed outside of the first dimension of the first surface and non-parallel to the first surface (e.g., or the touch-node electrodes disposed beneath the first surface). In some examples, one or more of the plurality of auxiliary electrodes are disposed at an angle ranging 30-60 degrees relative to a plane parallel to the first surface.

In some examples, the electronic device uses the plurality of auxiliary electrodes to reduce touch detection error caused by a dead-band region of the first surface (i.e., a region of the first surface where movement input provided by an object relative to the first surface is unable to be accurately detected due to saturation of touch signals provided by the plurality of touch-node electrodes). To reduce the dead-band region of the first surface, the electronic device uses the plurality of auxiliary electrodes to detect movement of the object that is partially outside of the first dimension of the first surface, thereby reducing the touch detection error caused by saturation of touch signals provided by the plurality of touch-node electrodes.

In some examples, the electronic device uses the plurality of auxiliary electrodes to reduce touch detection error caused by an input provided by an object near an edge of the first surface. For example, an input is provided by an object at or over an edge of the first surface. Because the plurality of touch-node electrodes are disposed beneath and parallel to the first surface (e.g., and therefore within the first dimension of the first surface), the plurality of touch-node electrodes are not able to accurately sense the portion of the object near the edge and/or outside of the first dimension of the first surface. To reduce the touch detection error, the electronic device uses the plurality of auxiliary electrodes to sense the portion of the object near the edge and/or outside of the first dimension of the first surface. As a result, the position (e.g., as defined by an estimated centroid of the input) and/or movement of the object can be more accurately detected.

In some examples, the electronic device is configured to detect an input corresponding to movement of an object relative to the first surface (e.g., moving in a direction corresponding to the first dimension) using one or more signals from the plurality of touch-node electrodes and one or more signals from the plurality of auxiliary electrodes. Detection of the movement is improved by the use of the plurality of auxiliary electrodes. In some examples, the plurality of touch-node electrodes and the plurality of auxiliary electrodes are coupled to the same sensing circuitry. In some examples, the electronic device includes a processor configured to detect the location and/or movement of the object relative to the first surface using the one or more signals from the plurality of touch-node electrodes and the one or more signals from the plurality of auxiliary electrodes.

BRIEF DESCRIPTION OF THE DRAWINGS

FIG. 8 illustrates an exemplary method for detecting an input provided by an object relative to a first surface of an electronic device, according to examples of the disclosure.

DETAILED DESCRIPTION

Figure 1A:
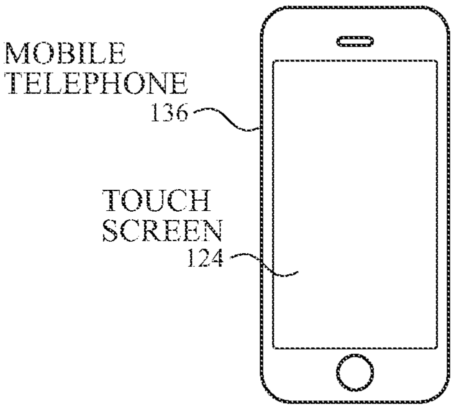
FIG. 1A-1H illustrate touch-sensing devices or systems that can include a touch screen or touch sensor panel according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some examples of the disclosure relate to an electronic device that includes one or more auxiliary electrodes to improve touch detection on a first surface of the electronic device. In some examples, the electronic device includes a housing comprising the first surface. In some examples, the first surface includes a first dimension (e.g., a first width). In some examples, the first dimension is less than 25 mm. In some examples, a plurality of touch-node electrodes are disposed beneath and parallel to the first surface. In some examples, a plurality of auxiliary electrodes are disposed outside of the first dimension of the first surface and non-parallel to the first surface (e.g., or the touch-node electrodes disposed beneath the first surface). In some examples, one or more of the plurality of auxiliary electrodes are disposed at an angle ranging 30-60 degrees relative to a plane parallel to the first surface.

In some examples, the electronic device uses the plurality of auxiliary electrodes to reduce touch detection error caused by a dead-band region of the first surface (i.e., a region of the first surface where movement input provided by an object relative to the first surface is unable to be accurately detected due to saturation of touch signals provided by the plurality of touch-node electrodes). To reduce the dead-band region of the first surface, the electronic device uses the plurality of auxiliary electrodes to detect movement of the object that is partially outside of the first dimension of the first surface, thereby reducing the touch detection error caused by saturation of touch signals provided by the plurality of touch-node electrodes.

In some examples, the electronic device uses the plurality of auxiliary electrodes to reduce touch detection error caused by an input provided by an object near an edge of the first surface. For example, an input is provided by an object at or over an edge of the first surface. Because the plurality of touch-node electrodes are disposed beneath and parallel to the first surface (e.g., and therefore within the first dimension of the first surface), the plurality of touch-node electrodes are not able to accurately sense the portion of the object near the edge and/or outside of the first dimension of the first surface. To reduce the touch detection error, the electronic device uses the plurality of auxiliary electrodes to sense the portion of the object near the edge and/or outside of the first dimension of the first surface. As a result, the position (e.g., as defined by an estimated centroid of the input) and/or movement of the object can be more accurately detected.

In some examples, the electronic device is configured to detect an input corresponding to movement of an object relative to the first surface (e.g., moving in a direction corresponding to the first dimension) using one or more signals from the plurality of touch-node electrodes and one or more signals from the plurality of auxiliary electrodes. Detection of the movement is improved by the use of the plurality of auxiliary electrodes. In some examples, the plurality of touch-node electrodes and the plurality of auxiliary electrodes are coupled to the same sensing circuitry. In some examples, the electronic device includes a processor configured to detect the location and/or movement of the object relative to the first surface using the one or more signals from the plurality of touch-node electrodes and the one or more signals from the plurality of auxiliary electrodes.

Figure 1B:
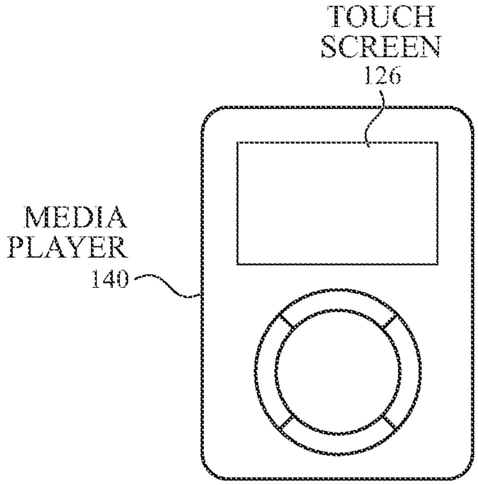
Figure 1C:
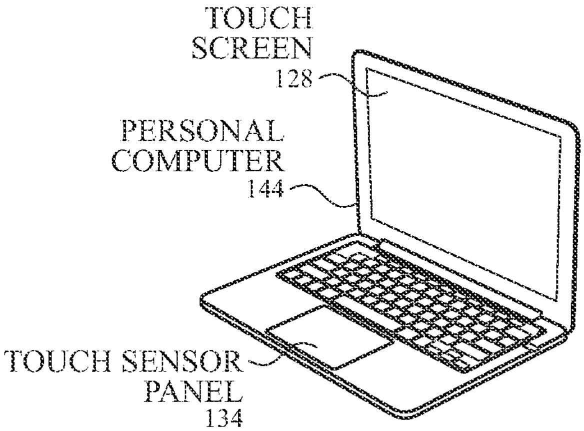
Figure 1D:
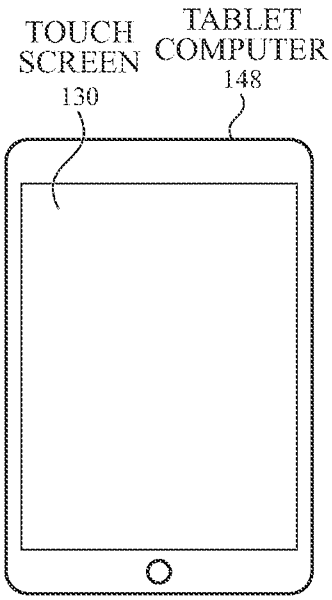
Figure 1E:
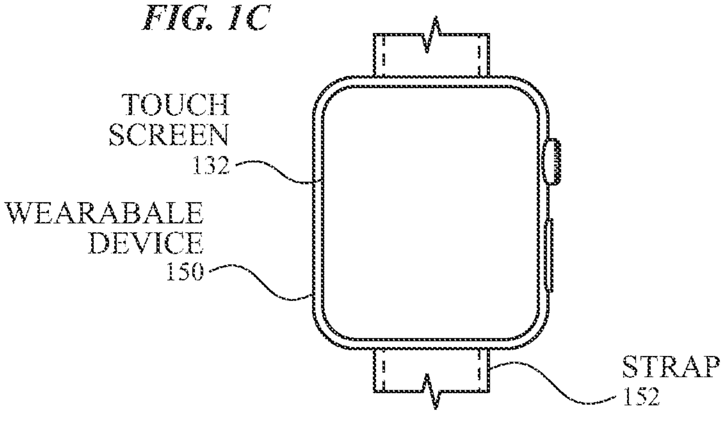
Figure 1F:
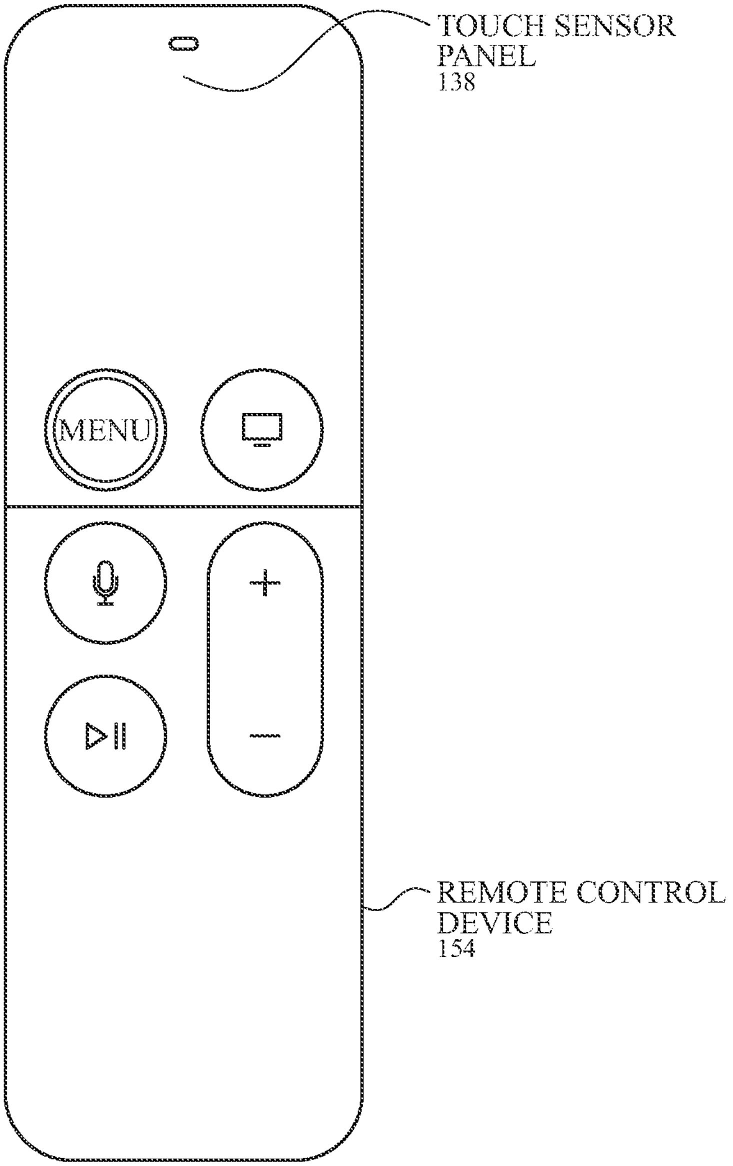
Figure 1G:
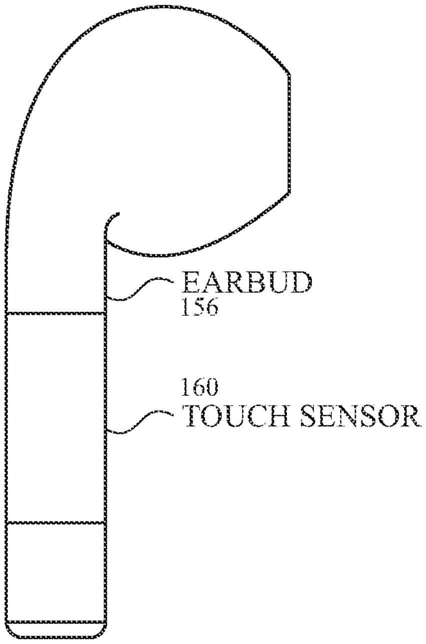
Figure 1H:
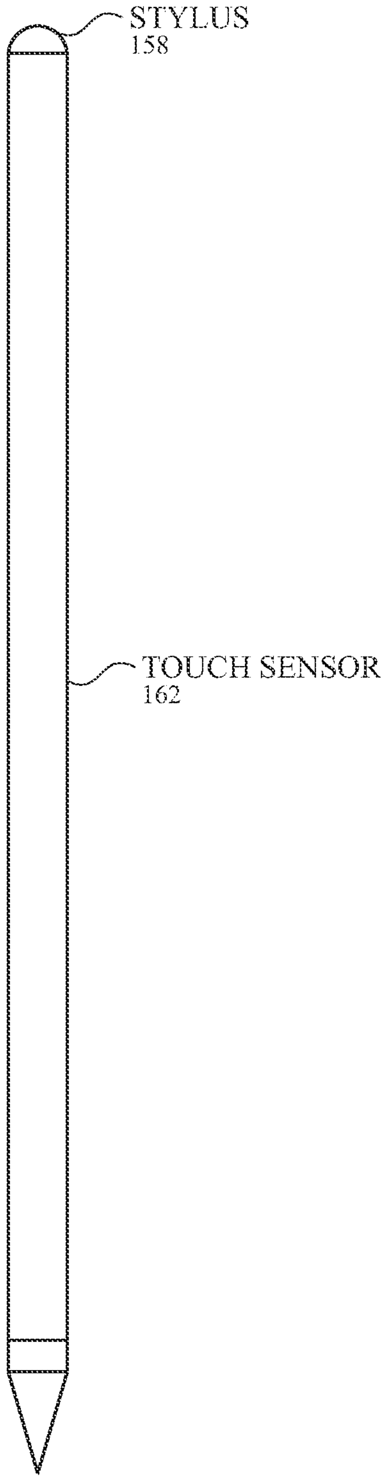

FIGS. 1A-1H illustrate touch-sensing devices or systems that can include a touch screen or touch sensor panel according to examples of the disclosure. FIG. 1A illustrates an example mobile telephone 136 that can include a touch screen 124 according to examples of the disclosure. FIG. 1B illustrates an example digital media player 140 that can include a touch screen 126 and/or a touch sensor panel according to examples of the disclosure. FIG. 1C illustrates an example personal computer 144 that can include a touch screen 128 and a track pad with a touch sensor panel according to examples of the disclosure. FIG. 1D illustrates an example tablet computing device 148 that can include a touch screen 130 according to examples of the disclosure. FIG. 1E illustrates an example wearable device 150 that includes a touch screen 132 and can be attached to a user using a strap 152 according to examples of the disclosure. FIG. 1F illustrates an example remote control device 154 that includes a touch sensor panel 138 according to examples of the disclosure. FIG. 1G illustrates an example earbud 156 that includes a touch sensor 160 according to examples of the disclosure. FIG. 1H illustrates an example stylus 158 that includes a touch sensor 162 according to examples of the disclosure. It is understood that a touch screen (which can include a touch sensor panel) or a touch sensor panel (without a touch screen, such as in a trackpad) can be implemented in other devices as well, and that the example systems of FIGS. 1A-1H can further include touch sensor panels on surfaces not shown in the figures.

In some examples, touch screens 124, 126, 128, 130 and 132, touch sensor panel 138, and touch sensors 160 and 162 can detect touch and/or proximity activity based on self-capacitance. A self-capacitance based touch system can include a matrix of small, individual plates of conductive material or groups of individual plates of conductive material forming larger conductive regions that can be referred to as touch electrodes or as touch-node electrodes (e.g., as described below with reference to FIG. 4B). For example, a touch screen or touch sensor panel can include a plurality of individual touch electrodes, each touch electrode identifying or representing a unique location (e.g., a touch node) on the touch screen or touch sensor panel at which touch or proximity is to be sensed, and each touch-node electrode being electrically isolated from the other touch-node electrodes in the touch screen/panel. Such a touch screen/panel can be referred to as a pixelated self-capacitance touch screen/panel, though it is understood that in some examples, the touch-node electrodes on the touch screen/panel can be used to perform scans other than self-capacitance scans on the touch screen/panel (e.g., mutual capacitance scans). During operation, a touch-node electrode can be stimulated with an alternating current (AC) waveform, and the self-capacitance to ground of the touch-node electrode can be measured. As an object approaches the touch-node electrode, the self-capacitance to ground of the touch-node electrode can change (e.g., increase). This change in the self-capacitance of the touch-node electrode can be detected and measured by the touch-sensing system to determine the positions of multiple objects when they touch, or come in proximity to, the touch screen/panel. In some examples, the touch-node electrodes of a self-capacitance based touch system can be formed from rows and columns of conductive material, and changes in the self-capacitance to ground of the rows and columns can be detected, similar to above. In some examples, a touch screen/panel can be multi-touch, single touch, projection scan, full-imaging multi-touch, capacitive touch, etc. As described herein, a plurality of auxiliary electrodes can be used improve accuracy of touch detection by the aforementioned touch sensor panels/touch screens.

In some examples, touch screens 124, 126, 128, 130 and 132, touch sensor panel 138 and touch sensors 160 and 162 can be based on mutual capacitance. A mutual capacitance based touch system can include electrodes arranged as drive and sense lines that may cross over each other on different layers (in a double-sided configuration), or may be adjacent to each other on the same layer (e.g., as described below with reference to FIG. 4A). The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch-sensing system to determine the positions of multiple objects when they touch, or come in proximity to, the touch screen/panel. As described herein, in some examples, a mutual capacitance based touch system can form touch nodes from a matrix of small, individual plates of conductive material.

In some examples, touch screens 124, 126, 128, 130 and 132, touch sensor panel 138, and touch sensors 160 and 162 can be based on mutual capacitance and/or self-capacitance. The electrodes can be arranged as a matrix of small, individual plates of conductive material (e.g., as in touch-node electrodes 408 in touch screen/panel 402 in FIG. 4B) or as drive lines and sense lines (e.g., as in row touch electrodes 404 and column touch electrodes 406 in touch screen/panel 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
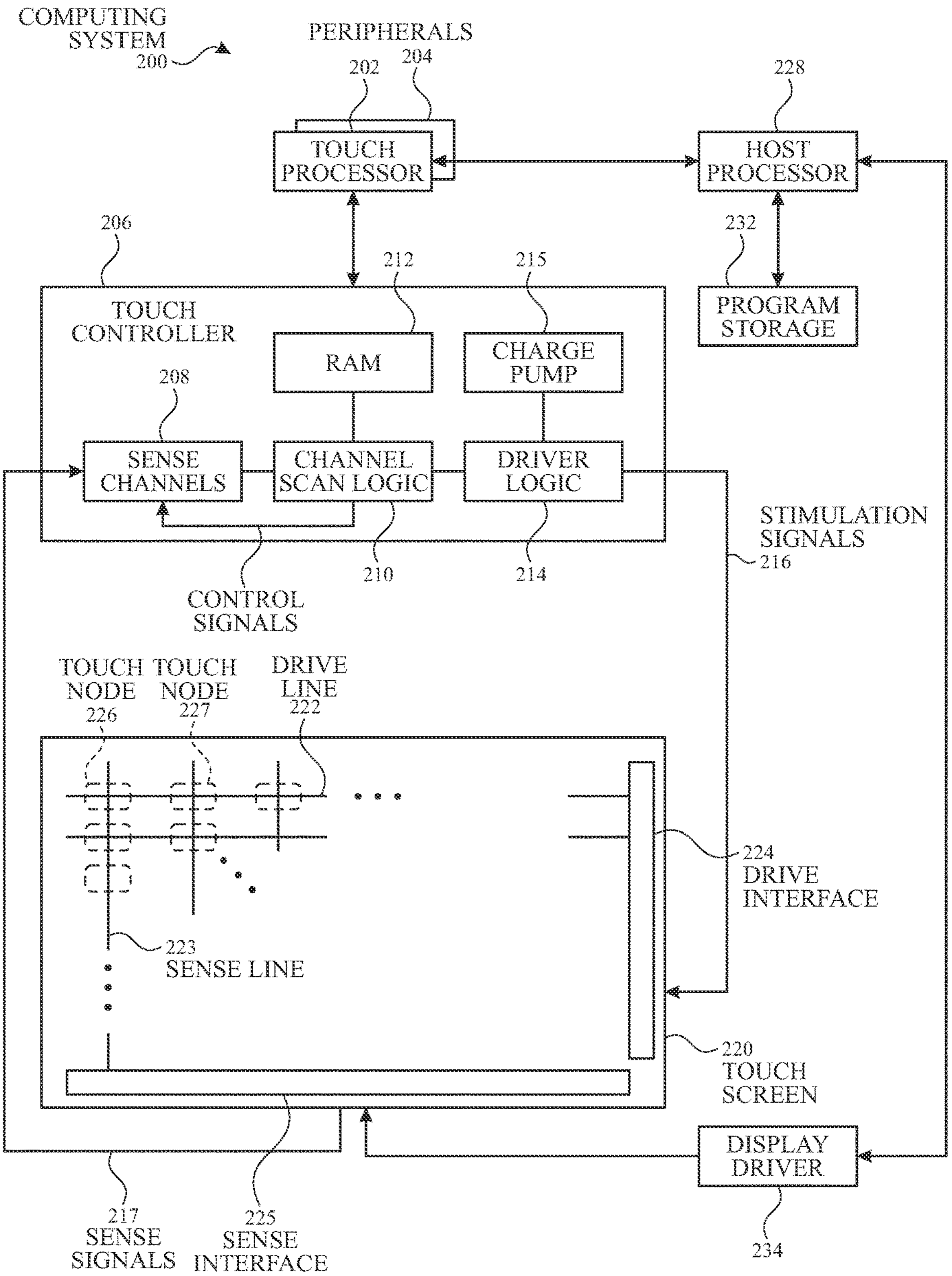
FIG. 2 illustrates a computing system including a touch screen according to examples of the disclosure.

FIG. 2 illustrates an example computing system including a touch screen according to examples of the disclosure, although it should be understood that the illustrated touch screen 220 (which includes a touch sensor panel) could instead be only a touch sensor panel. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch-sensing system including one or more touch processors 202, peripherals 204, a touch controller 206, and touch-sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch-sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself. The example computing system 200 of FIG. 2 can be configured to implement and perform any of the scans and comparisons described below.

It should be apparent that the architecture shown in FIG. 2 is only one example architecture of computing system 200, and that the system could have more or fewer components than shown, or a different configuration of components. The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may be described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI) and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described in this disclosure can be performed by firmware stored in memory (e.g., one of the peripherals 204 in FIG. 2) and executed by touch processor 202 or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch-sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch-sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch node in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to driver logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
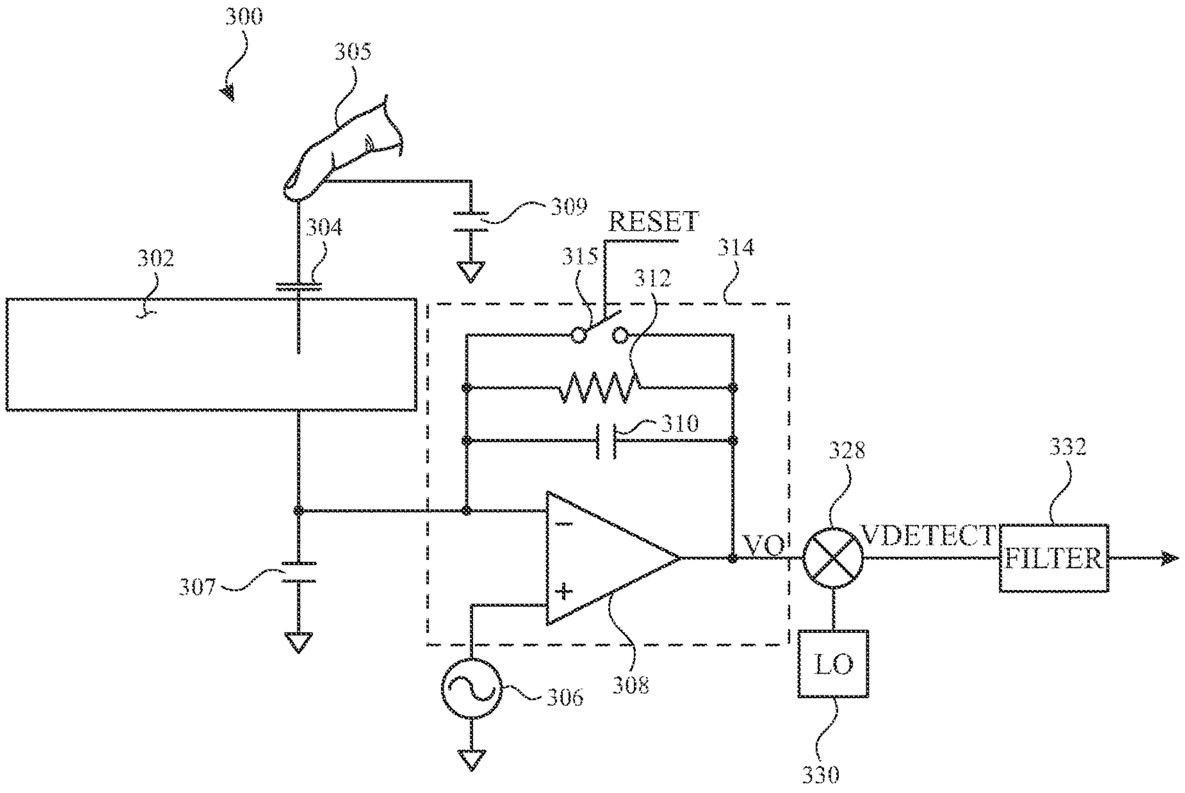
FIG. 3A illustrates a touch sensor circuit corresponding to a self-capacitance measurement of a touch-node electrode and sensing circuit according to examples of the disclosure.

FIG. 3A illustrates an exemplary touch sensor circuit 300 corresponding to a self-capacitance measurement of a touch-node electrode 302 and sensing circuit 314 (e.g., corresponding to a sense channel 208) according to examples of the disclosure. Touch-node electrode 302 can correspond to a touch electrode 404 or 406 of touch screen/panel 400 or a touch-node electrode 408 of touch screen/panel 402. Touch-node electrode 302 can have an inherent self-capacitance to ground associated with it, and also an additional self-capacitance to ground that is formed when an object, such as finger 305, is in proximity to or touching the electrode. The total self-capacitance to ground of touch-node electrode 302 can be illustrated as capacitance 304. Touch-node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch-node electrode 302 can be coupled to the inverting input (−) of operational amplifier 308. An AC voltage source 306 (Vac) can be coupled to the non-inverting input (+) of operational amplifier 308. Touch sensor circuit 300 can be configured to sense changes (e.g., increases) in the total self-capacitance 304 of the touch-node electrode 302 induced by a finger or object either touching or in proximity to the touch screen/panel. Output 320 can be used by a processor to determine the presence of a proximity or touch event, or the output can be inputted into a discrete logic network to determine the presence of a proximity or touch event.

Figure 3B:
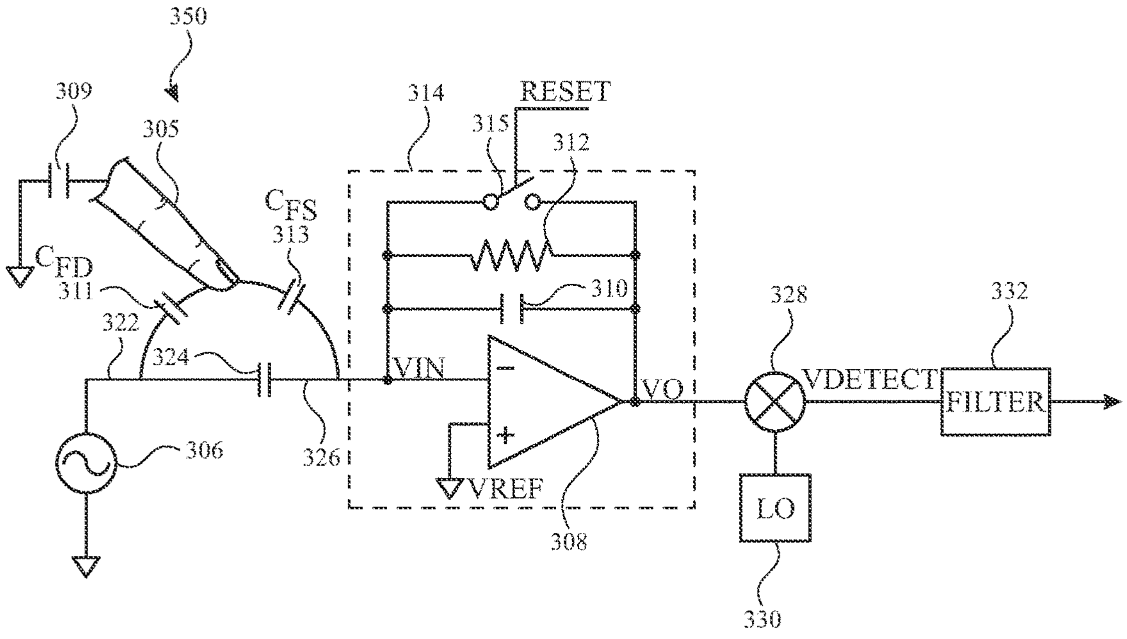
FIG. 3B illustrates a touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 (e.g., corresponding to a sense channel 208) according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch-node created by the intersection of drive line 322 and sense line 326, mutual capacitance 324 can change (e.g., decrease). This change in mutual capacitance 324 can be detected to indicate a touch or proximity event at the touch-node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage Vref. Operational amplifier 308 can drive its output to voltage Vo to keep Vin substantially equal to Vref, and can therefore maintain Vin constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce Vdetect. Vdetect can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of Vdetect can be used to determine if a touch or proximity event has occurred. Note that while FIGS. 3A-3B indicate the demodulation at multiplier 328 occurs in the analog domain, output Vo may be digitized by an analog-to-digital converter (ADC), and blocks 328, 332 and 330 may be implemented in a digital fashion (e.g., 328 can be a digital demodulator, 332 can be a digital filter, and 330 can be a digital NCO (Numerical Controlled Oscillator).

Referring back to FIG. 2, in some examples, touch screen 220 can be an integrated touch screen in which touch-sensing circuit elements of the touch-sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
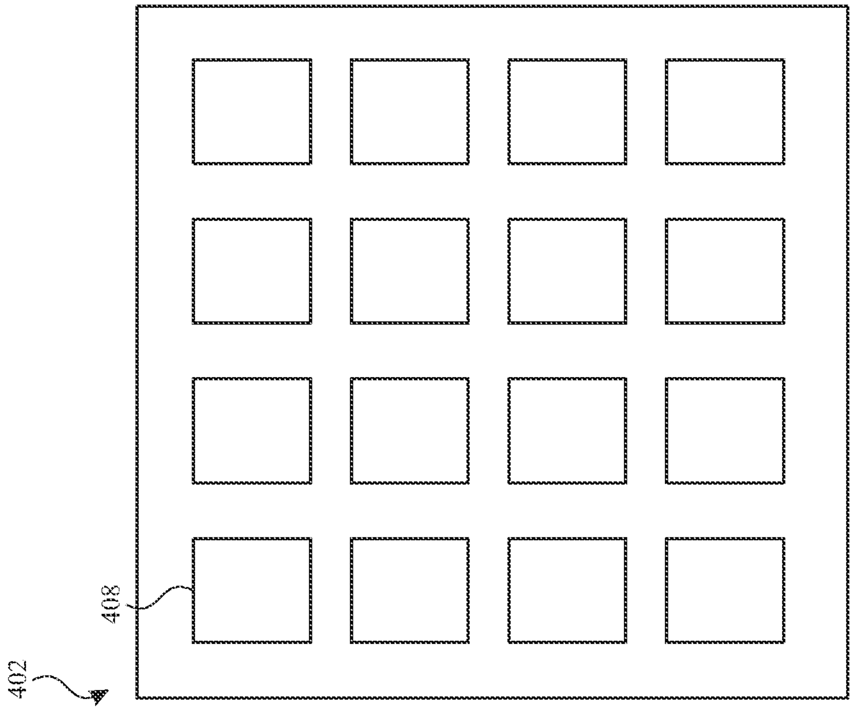
FIG. 4B illustrates a touch screen or touch sensor panel with touch-node electrodes arranged in a pixelated touch-node electrode configuration according to examples of the disclosure.
Figure 4A:
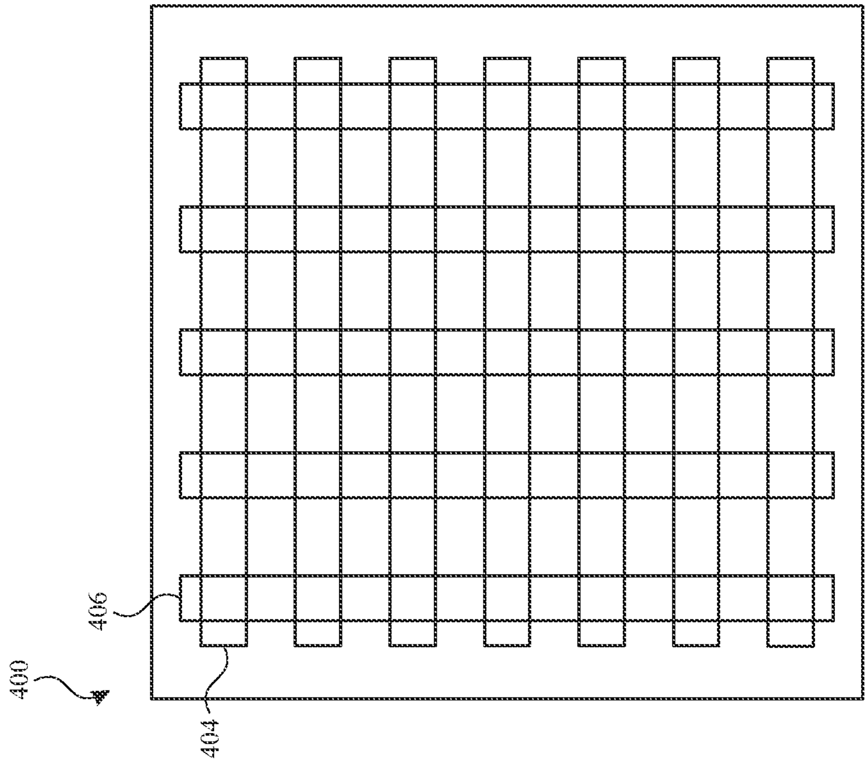
FIG. 4A illustrates a touch screen or touch sensor panel with touch electrodes arranged in rows and columns according to examples of the disclosure.

FIG. 4A illustrates a touch screen or touch sensor panel 400 with touch electrodes 404 and 406 arranged in rows and columns according to examples of the disclosure. Specifically, touch screen/panel 400 can include a plurality of touch electrodes 404 disposed as rows, and a plurality of touch electrodes 406 disposed as columns. Touch electrodes 404 and touch electrodes 406 can be on the same or different material layers on touch screen/panel 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, touch screen/panel 400 can sense the self-capacitance of touch electrodes 404 and 406 to detect touch and/or proximity activity on touch screen/panel 400, and in some examples, touch screen/panel 400 can sense the mutual capacitance between touch electrodes 404 and 406 to detect touch and/or proximity activity on touch screen 400.

FIG. 4B illustrates a touch screen or touch sensor panel 402 with touch-node electrodes 408 arranged in a pixelated touch-node electrode configuration according to examples of the disclosure. Specifically, touch screen/panel 402 can include a plurality of individual touch-node electrodes 408, each touch-node electrode identifying or representing a unique location on the touch screen/panel at which touch or proximity (i.e., a touch or proximity event) is to be sensed, and each touch-node electrode being electrically isolated from the other touch-node electrodes in the touch screen/panel, as previously described. Touch-node electrodes 408 can be on the same or different material layers on touch screen/panel 402. In some examples, touch screen/panel 402 can sense the self-capacitance of touch-node electrodes 408 to detect touch and/or proximity activity on touch screen/panel 402, and in some examples, touch screen/panel 402 can sense the mutual capacitance between touch-node electrodes 408 to detect touch and/or proximity activity on touch screen/panel 402.

Although not illustrated in FIG. 2, as described herein, a plurality of auxiliary electrodes can be used to improve accuracy of touch and/or proximity detection of touch-sensitive surfaces, such as example touch screens 124, 126, 128, 130, 132, touch sensor panel 138, and touch sensors 160 and 162 shown in FIGS. 1A-1H. Some exemplary touch-sensitive surfaces provided by electronic devices, such as those described with reference to FIGS. 1A-1H, include a touch sensitive surface having one or more dimensions (e.g., length and/or width) that are small relative to an input object. For example, an example remote control device 154 (or other handheld device) includes a touch sensor panel 138 that may be narrow and comparable in size to a user's finger (e.g., thumb), such as within a threshold width of the user's finger (e.g., ±2 mm, ±3 mm, ±5 mm). In such examples, touch-node electrodes (e.g., touch electrodes and/or touch-node electrodes as described with reference to FIGS. 4A and/or 4B) are disposed beneath and parallel to the touch-sensitive surface. However, such touch-node electrodes may less accurately detect input (e.g., including touch and/or proximity relative to the touch-sensitive surface) provided by an object (e.g., a finger or probe) that includes a dimension that is greater than, equal to, or within a threshold amount (e.g., ±1 mm, ±2 mm, or ±5 mm) of a dimension of the touch-sensitive surface (e.g., a finger is 20 mm in width touches a touch-sensitive surface that is 17 mm in width). Particularly, in such a scenario, the input provided by the object may cause signal saturation due to the object being sensed capacitively by an entire row, column, and/or grid of touch-node electrodes that span the dimension of the touch-sensitive surface. As a result, it may be difficult to accurately detect a location (e.g., as defined by an estimated centroid of the input) of the object relative to the touch-sensitive surface. Further, an input that includes movement of the object relative to the touch-sensitive surface (e.g., such as a swipe input) along the dimension (e.g., in a direction parallel to the dimension) of the touch-sensitive surface may be difficult to detect due to the signal saturation because the centroid detected by the system does not move under saturation despite some movement by the object. As a result, a touch-sensitive surface may have a "dead-band" region in which movement of the object cannot be detected. Additionally, the centroid when an object is at an edge of the touch-sensitive surface may be less accurate because the signal corresponding to the object is measured by touch-node electrodes disposed beneath the touch-sensitive surface, but not outside the touch-sensitive surface. The examples shown and described with reference to FIGS. 6A-6B, 7A-7D, 8, and 9 address improvements resulting in the reduction and/or elimination of centroid error near an edge and/or of a dead-band of a touch-sensing system (e.g., a region of the touch-sensitive surface where movement input provided by an object is unable to be accurately detected using the touch-sensing system of the electronic device due to saturation).

Figure 5A:
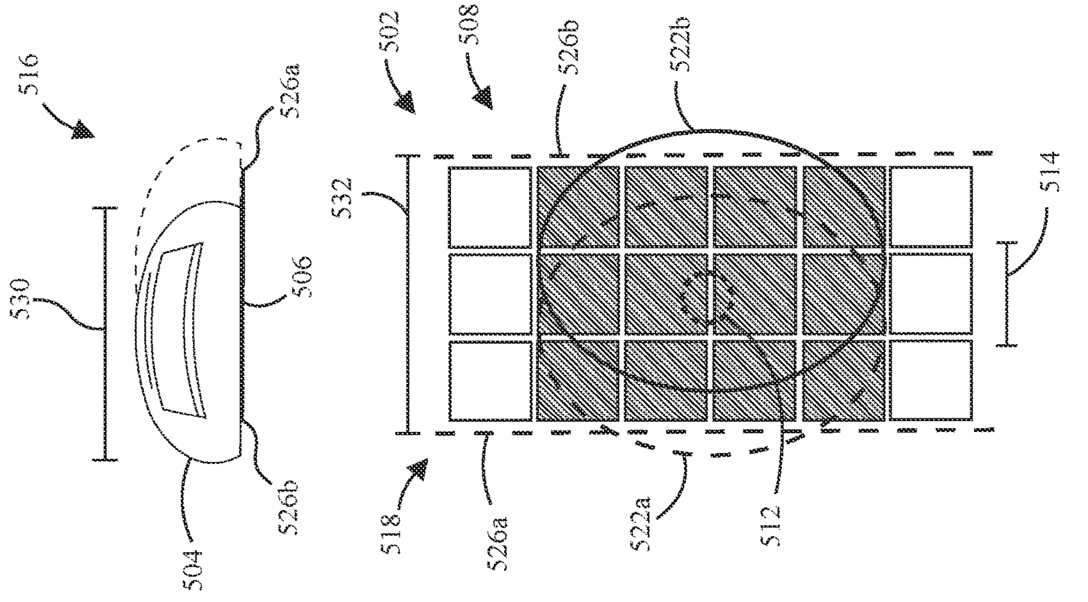
FIG. 5A illustrates a top-down view of an example of a touch-sensing system of an electronic device, and a front-view of an input provided by an object on a touch-sensitive surface of the electronic device, according to examples of the disclosure.

FIG. 5A illustrates a top-down view of an example of a touch-sensing system of an electronic device, and a front-view of an input provided by an object on a touch-sensitive surface of the electronic device, according to examples of the disclosure. FIG. 5A includes a front-view 516 of an exemplary object 504 providing a touch-input on a touch-sensitive surface 506, and a top-down view 518 of a plurality of touch-node electrodes 508. In some examples, touch-sensitive surface 506 and touch-node electrodes 508 are components of a touch-sensing system for an electronic device 502 (e.g., such as devices shown and described with reference to FIGS. 1A-1H). In some examples, the touch-sensing system includes touch-sensing circuitry coupled to touch-node electrodes 508 for sensing touch and/or proximity activity (e.g., such as the touch-input provided by object 504 relative to touch-sensitive surface 506 as shown in FIG. 5A). In some examples, touch-node electrodes 508 are disposed beneath and parallel to touch-sensitive surface 506. In some examples, touch-node electrodes 508 detect the touch-input provided by object 504 through capacitance sensing (e.g., based on self-capacitance and/or mutual capacitance).

As shown in front-view 516 of FIG. 5A, object 504 is a finger. In some examples, object 504 may be a stylus or other device used by a user of the electronic device for performing touch and/or proximity activity relative to touch-sensitive surface 506. As shown in front-view 516, object 504 includes a first dimension 530. For example, first dimension 530 is a width of object 504. In some examples, first dimension 530 is 10-30 mm. In some examples, first dimension 530 is 15-25 mm. As shown in top-down view 518, the plurality of touch-node electrodes 508 span a first dimension 532 (e.g., parallel to first dimension of the object). In some examples, the first dimension 532 corresponds to a first dimension of touch-sensitive surface 506. For example, first dimension 532 corresponds to a width of touch-sensitive surface 506. In some examples, first dimension 532 is 30 mm or less. In some examples, the first dimension is less than 25 mm. In some examples, the first dimension is less than 20 mm. In some examples, first dimension 532 spans from a first edge 526*a* to a second edge 526*b* of touch-sensitive surface 506. In some examples, touch-node electrodes 508 are disposed within an area beneath touch-sensitive surface 506 (e.g., within first dimension 532) and between first edge 526*a* and second edge 526*b*. In some examples, first dimension 530 of object 504 is equal to or larger than first dimension 532 of touch-sensitive surface 506. In some examples, first dimension 530 of object 504 is within a threshold amount (e.g., ±1 mm, ±2 mm, or ±5 mm) of first dimension 532 of touch-sensitive surface 506.

In some examples, the touch-input provided by object 504 includes movement (represented by the solid and dashed-line representations of object 504 in front-view 516 in FIG. 5A). Particularly, object 504 includes a first position 522*a* and a second position 522*b* relative to touch-sensitive surface 506. For example, movement of object 504 includes a swipe input relative to touch-sensitive surface 506 starting from position 522*a* and ending at position 522*b*. As shown in top-down view 518, movement of object 504 from position 522*a* to position 522*b* includes movement of object in a direction from first edge 526*a* to second edge 526*b*. Although the location of object 504 changes relative to touch-sensitive surface 506 during the touch-input, the same centroid 512 is detected by electronic device 502 (e.g., due to saturation of the signal at the touch-node electrodes across the width of the touch-sensitive surface). Because centroid 512 detected by electronic device 502 does not appear to change in response to the input provided by object 504, the movement of object 504 is not accurately detected. Top-down view 518 includes a representation of a dead-band area 514 of touch-sensitive surface 506. Particularly, due to the first dimension 530 being greater than, equal to, or within a threshold length of first dimension 532, electronic device 502 is not able to accurately detect a change of position of the actual centroid of the input within dead-band area 514 of touch-sensitive surface 506.

Figure 5B:
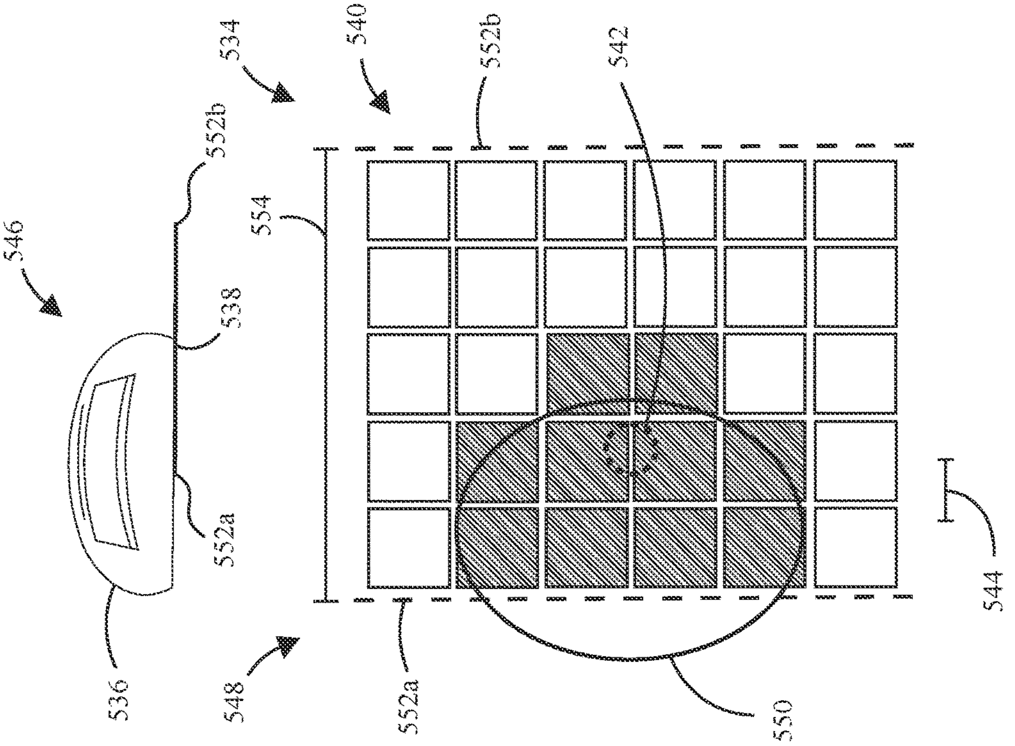
FIG. 5B illustrates a top-down view of an example of a touch-sensing system of an electronic device, and a front-view of an input provided by an object on a touch-sensitive surface of the electronic device, according to examples of the disclosure.

FIG. 5B illustrates a top-down view of an example of a touch-sensing system of an electronic device, and a front-view of an input provided by an object on a touch-sensitive surface of the electronic device, according to examples of the disclosure. FIG. 5B includes a front-view 546 of an example object 536 providing a touch-input on a touch-sensitive surface 538, and a top-down view 548 of a plurality of touch-node electrodes 540. In some examples, touch-sensitive surface 538 and touch-node electrodes 540 are components of a touch-sensing system for an electronic device 534 (e.g., such as exemplary devices shown and described with reference to FIGS. 1A-1H). In some examples, electronic device 534 includes touch-sensing circuitry coupled to touch-node electrodes 540 for sensing touch and/or proximity activity (e.g., such as touch-input provided by object 536 relative to touch-sensitive surface 538 as shown in front-view 546). In some examples, touch-node electrodes 540 are disposed beneath and parallel to touch-sensitive surface 538. In some examples, touch-node electrodes 540 detect the touch-input provided by object 536 through capacitance sensing (e.g., based on self-capacitance and/or mutual capacitance).

As shown in front-view 546, object 536 is a finger. In some examples, object 536 may be a stylus or other device used by a user of electronic device 534 for performing touch and/or proximity activity relative to touch-sensitive surface 538. As shown in top-down view 548, the plurality of touch-node electrodes 540 span a first dimension 554. In some examples, first dimension 554 corresponds to a first dimension of touch-sensitive surface 538. For example, first dimension 554 is a width of touch-sensitive surface 538. In some examples, touch-node electrodes 540 are disposed between a first edge 552*a* of touch-sensitive surface 538 and a second edge 552*b* of touch-sensitive surface 538. As shown in top-down view 548, first edge 552*a* and second edge 552*b* are schematically represented by dashed lines on opposite sides of the plurality of touch-node electrodes 540.

In some examples, the touch-input provided by object 536 on touch-sensitive surface 538 includes a position 550 of object 536 relative to touch-sensitive surface 538 that includes an area of object 536 on either side of first edge 552*a* of touch-sensitive surface 538 (e.g., a portion of object 536 is positioned within first dimension 554 (e.g., between first edge 552*a* and second edge 552*b*), and a portion of object 536 is positioned outside of first dimension 554 (e.g., outside of first edge 552*a*)). Due to the lack of touch electrodes outside of first dimension 554 (e.g., outside of first edge 552*a*), electronic device 534 detecting a location of a centroid of the touch-input provided by object 536 at position 550 near an edge (e.g., within 5 mm) of touch-sensitive surface 538 may be less accurate compared with centroid estimation near the center of touch-sensitive surface 538. In particular, a sense detection error 544 (along first dimension 554) may exist between an estimated centroid location (e.g., as depicted by estimated centroid 542) and an actual centroid location of the touch-input provided by object 536 relative to touch-sensitive surface 538.

Figure 6B:
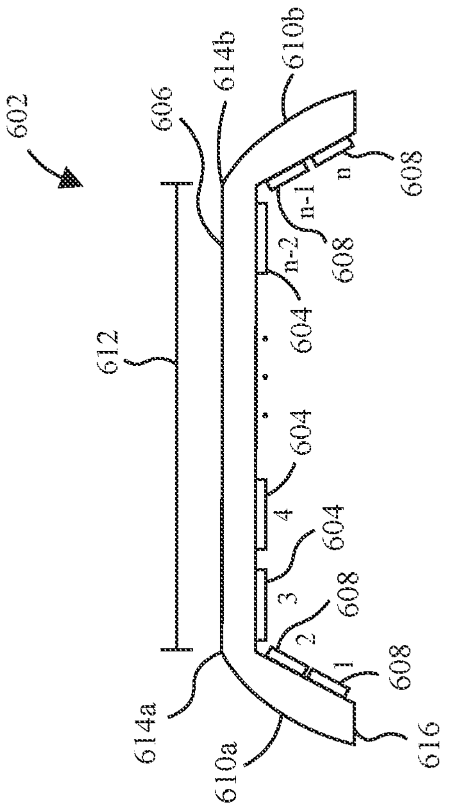
FIG. 6B illustrates a cross-sectional-view of an example of an electronic device including a plurality of auxiliary electrodes disposed outside of a first dimension of a touch-sensitive surface of the electronic device, according to examples of the disclosure.
Figure 6A:
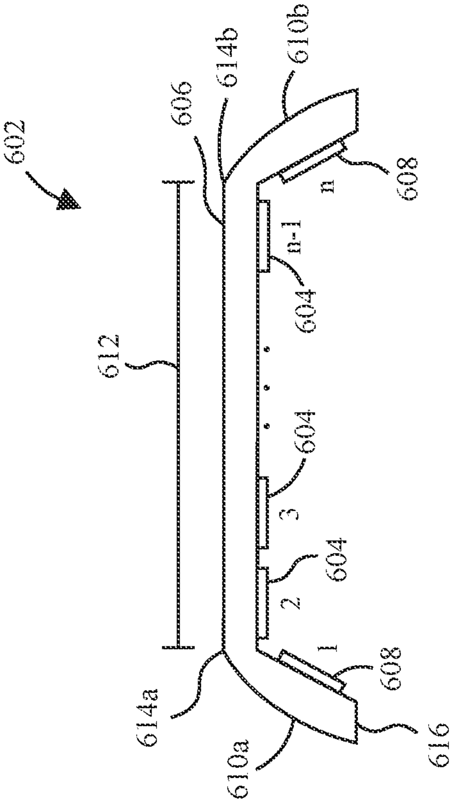
FIG. 6A illustrates a cross-sectional view of an example of an electronic device including a plurality of auxiliary electrodes disposed outside of a first dimension of a touch-sensitive surface of the electronic device, according to examples of the disclosure.

As described herein, in some examples, auxiliary electrodes are added to improve touch detection. FIGS. 6A-6B illustrate sectioned-views of examples of an electronic device including a plurality of auxiliary electrodes disposed outside of a first dimension of a touch-sensitive surface, according to examples of the disclosure. As shown in FIGS. 6A-6B, an electronic device 602 (e.g., such as a device shown and described with reference to FIGS. 1A-1H) includes a housing 616 including a touch-sensitive surface 606. Similar to the description of touch-sensitive surface 506, touch-sensitive surface 606 includes a first dimension 612 (e.g., a width of the touch-sensitive surface 606) that spans between a first edge 614*a* and a second edge 614*b* of touch-sensitive surface 606. As shown in FIGS. 6A-6B, adjacent to first edge 614*a* is a side surface 610*a* of housing 616, and adjacent to second edge 614*b* is a side surface 610*b* of housing 616. In some examples, side surfaces 610*a* and 610*b* are curved and/or slanted (e.g., at an angle non-parallel to touch-sensitive surface 606). As shown in FIGS. 6A and 6B, side surfaces 610*a* and 610*b* are disposed outside of first dimension 612 (e.g., not between first edge 614*a* and second edge 614*b* of touch-sensitive surface 606). In some examples, side surfaces 610*a* and 610*b* are curved surfaces of a mobile device, laptop, stylus, TV remote, earphone or a gaming remote that are adjacent to a touch-sensitive surface (e.g., such as example touch screens 124, 126, 128, 130, 132, touch sensor panel 138, and touch sensors 160 and 162 shown in FIGS. 1A-1H).

As shown in FIGS. 6A and 6B, a plurality of touch-node electrodes 604 are disposed beneath and parallel to touch-sensitive surface 606. In some examples, touch-node electrodes 604 include arrangements as shown and described with reference to FIGS. 4A and 4B. In some examples, touch-node electrodes 604 are coupled to a touch-sensing circuit as shown and described with reference to FIGS. 3A and/or 3B to detect mutual-capacitance and/or self-capacitance touch and/or proximity activity relative to touch-sensitive surface 606. A plurality of auxiliary electrodes 608 are disposed outside of first dimension 612 of touch-sensitive surface 606. Auxiliary electrodes 608 are disposed beneath side surfaces 610*a* and 610*b*, and outside of first dimension 612 (e.g., and outside of edges 614*a* and 614*b*). In some examples, auxiliary electrodes 608 are disposed at an angle non-parallel to touch-sensitive surface 606 (e.g., and thus non-parallel to touch-node electrodes 604). In some examples, one or more (or each) of the auxiliary electrodes 608 are disposed at an angle between 15-75 degrees relative to a plane parallel to touch-sensitive surface 606. In some examples, one or more (or each) of the auxiliary electrodes 608 are disposed at an angle between 30-60 degrees relative to a plane parallel to touch-sensitive surface 606. In some examples, one or more (or each) of the auxiliary electrodes 608 are disposed at an angle between 30-60 degrees relative to a plane parallel to touch-sensitive surface 606. In some examples, auxiliary electrodes 608 are coupled to the same or similar sensing circuitry as touch-node electrodes 604 (e.g., such as circuitry shown and described with reference to FIGS. 3A and 3B). In some examples, the touch-sensing circuit is configured to sense the self-capacitance of auxiliary electrodes 608 to detect touch and/or proximity activity relative to touch-sensitive surface 606. In some examples, the touch-sensing circuit is configured to sense the mutual-capacitance of auxiliary electrodes 608 to detect touch and/or proximity activity relative to touch-sensitive surface 606. In some examples, auxiliary electrodes 608 are formed from plates of conductive material (e.g., as described with reference to touch-node electrodes 408 in regard to FIG. 4B). In some examples, auxiliary electrodes 608 and touch-node electrodes 604 are formed on a single substrate (e.g., with the sensing circuitry). For example, the substrate is optionally monolithic and formed of a transparent, flexible material (e.g., and coated with a semiconductor material, such as ITO). In some examples, auxiliary electrodes 608 and touch-node electrodes 604 are formed on a substrate (e.g., with sensing circuitry) that is not monolithic (e.g., the substrate includes one or more segments to account for stress relief and/or space constraints of housing 616). In some examples, the substrate is laminated on the rear surfaces of side surfaces 610*a*, 610*b*, and touch-sensitive surface 606.

Figure 7A:
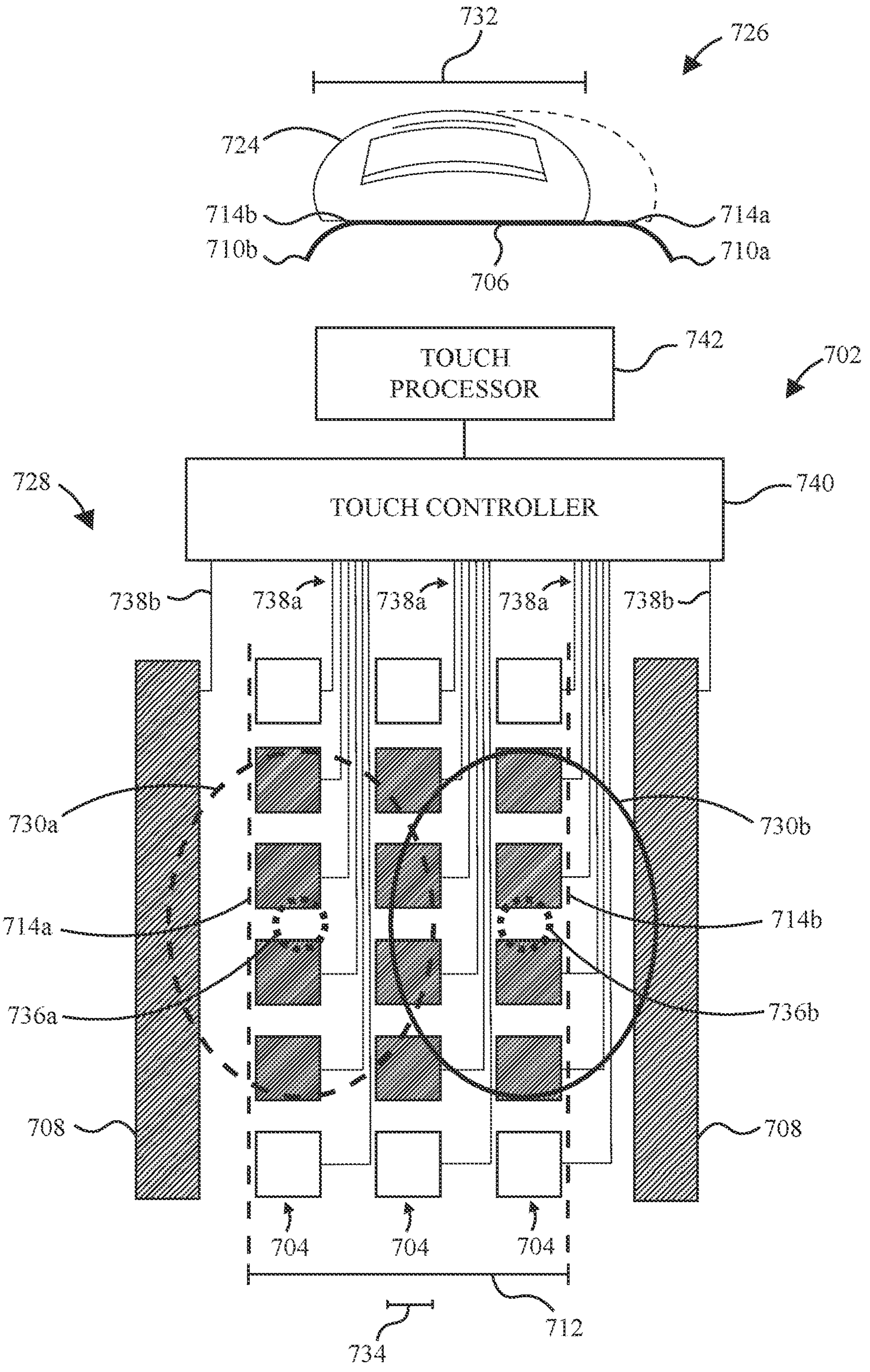
FIG. 7A illustrates an example of a touch-sensing system of an electronic device including one or more elongated auxiliary electrodes used to detect a location and/or movement of an object relative to a touch-sensitive surface, according to examples of the disclosure.
Figure 7B:
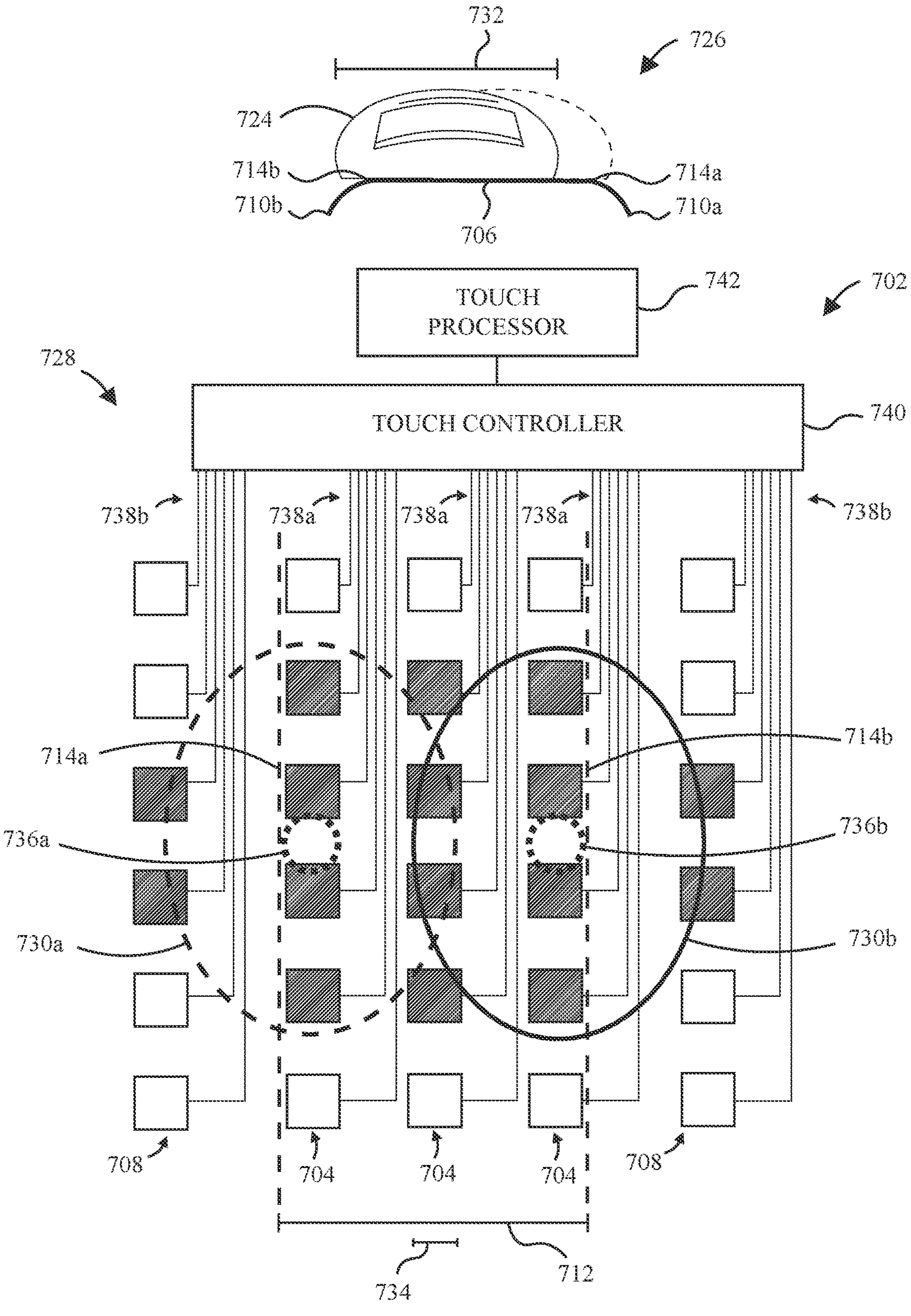
FIG. 7B illustrates an example of a touch-sensing system of an electronic device including a plurality of auxiliary electrodes arranged in one or more columns used to detect a location and/or movement of an object relative to a touch-sensitive surface, according to examples of the disclosure.

FIG. 6A includes a first example of electronic device 602 including at least two auxiliary electrodes 608 disposed outside of first dimension 612 of touch-sensitive surface 606, according to examples of the disclosure. In some examples, the first example of electronic device 602 includes a column of one or more auxiliary electrodes 608 disposed beneath surface 610*a*, and a column of one or more auxiliary electrodes 608 disposed beneath surface 610*b*. In some examples, each column spans along a second dimension of touch-sensitive surface 606 opposite from first dimension 612 (e.g., the second dimension spans in a direction normal to a direction parallel to first dimension 612, such as the length normal to the width of the touch-sensitive surface). In some examples, as illustrated in FIG. 7A, auxiliary electrodes 608 include a first auxiliary electrode disposed beneath surface 610*a* (labeled as electrode "1" for a row of electrodes in FIG. 6A) and a second auxiliary electrode (labeled as electrode "n" for a row of electrodes in FIG. 6A) disposed beneath surface 610*b*. In some examples, the first auxiliary electrode and the second auxiliary electrode are elongated and span along the second dimension of touch-sensitive surface 606. In some examples, as illustrated in FIG. 7B, auxiliary electrodes 608 include a plurality of auxiliary electrodes disposed in a column beneath surface 610*a* and a plurality of auxiliary electrodes disposed in a column beneath surface 610*b*. In some examples, auxiliary electrodes 608 are disposed in a pixelated configuration (e.g., the pixelated configuration does not include an arrangement of auxiliary electrodes 608 into rows and/or columns). In some examples, the configuration of auxiliary electrodes 608 corresponds to the configuration of touch-node electrodes 604 (e.g., if touch-node electrodes 604 are arranged in a row-column arrangement, auxiliary electrodes 608 are arranged in a row-column arrangement).

Figure 7C:
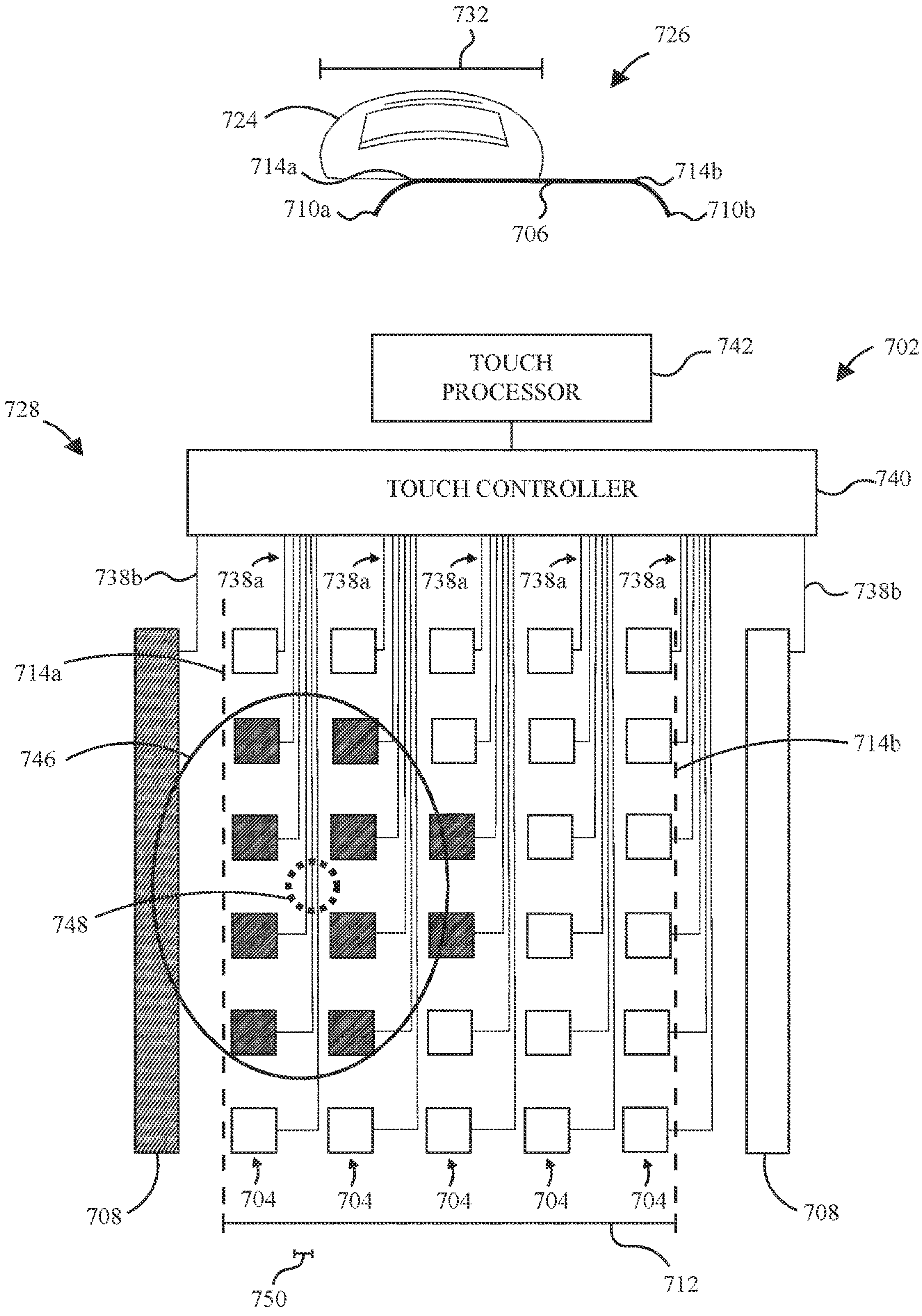
FIG. 7C illustrates an example of a touch-sensing system of an electronic device including one or more elongated auxiliary electrodes used to detect a location and/or movement of an object in proximity to an edge of a touch-sensitive surface, according to examples of the disclosure.
Figure 7D:
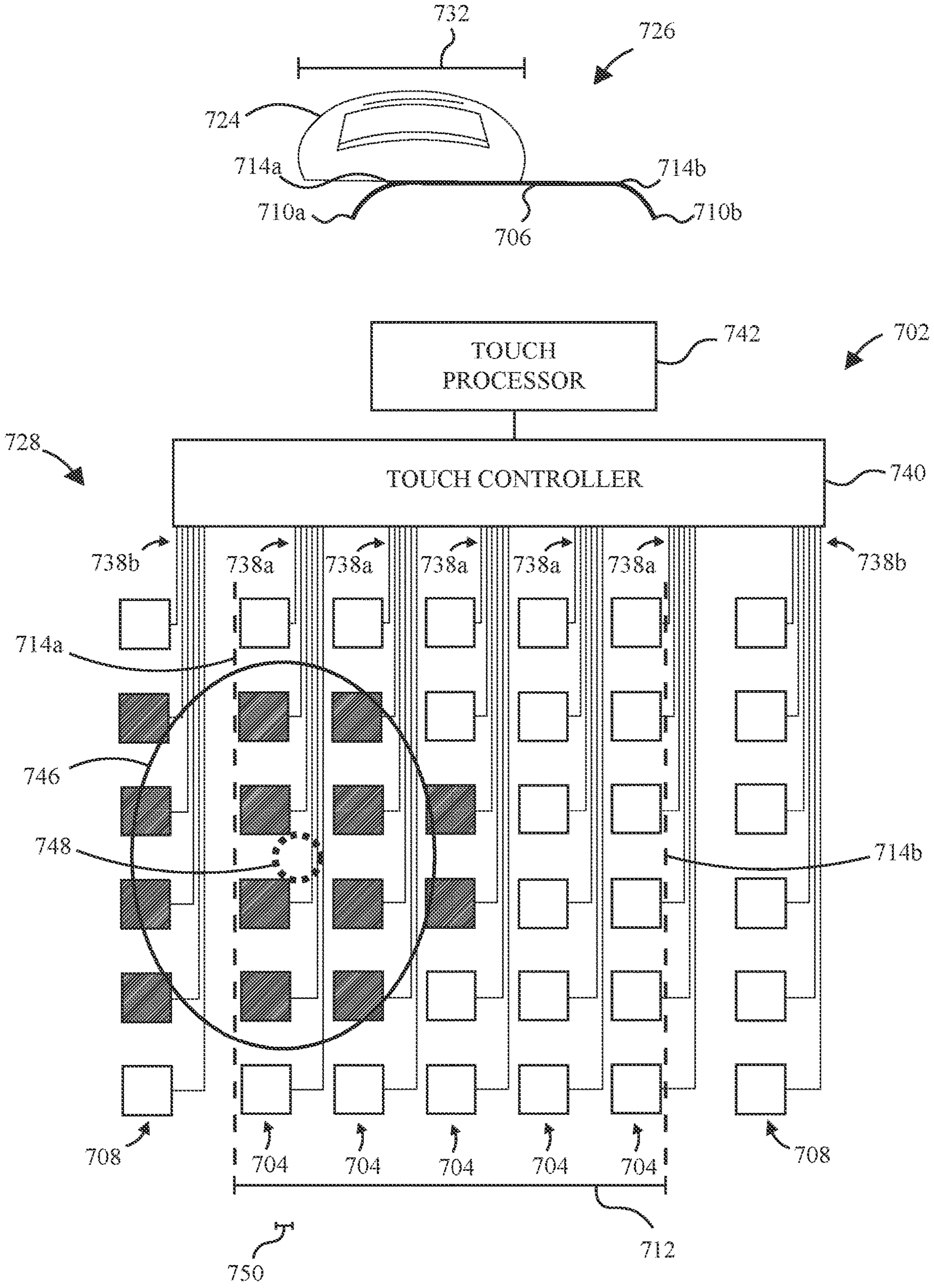
FIG. 7D illustrates an example of a touch-sensing system of an electronic device including a plurality of auxiliary electrodes arranged in one or more columns used to detect a location and/or movement of an object in proximity to an edge of a touch-sensitive surface, according to examples of the disclosure.

FIG. 6B includes a second example of electronic device 602 including at least four auxiliary electrodes 608 disposed outside of first dimension 612 of touch-sensitive surface 606, according to examples of the disclosure. In some examples, the second example of electronic device 602 includes a first column and second column of one or more auxiliary electrodes 608 disposed beneath surface 610*a*, and a third column and a fourth column of one or more auxiliary electrodes 608 disposed beneath surface 610*b*. In some examples, each column of auxiliary electrodes 608 span along a second dimension of touch-sensitive surface 606 opposite from first dimension 612 (e.g., the second dimension spans in a direction normal to first dimension 612). In some examples, auxiliary electrodes 608 include a first electrode and a second electrode (labeled as electrodes "1" and "2" for a row of electrodes in FIG. 6B) disposed beneath surface 610*a*, and a third and a fourth electrode (labeled as electrodes "n" and "n−1" for a row of electrodes in FIG. 6B) disposed beneath surface 610*b*. In some examples, as illustrated in FIG. 7C, the first, second, third and fourth auxiliary electrodes 608 are elongated and span along the second dimension of touch-sensitive surface 606. In some examples, as illustrated in FIG. 7D, auxiliary electrodes 608 include a plurality of auxiliary electrodes disposed in the first and second column beneath surface 610*a*, and a plurality of auxiliary electrodes disposed in the third and fourth column beneath surface 610*b*. In some examples, auxiliary electrodes 608 are all disposed at the same angle non-parallel to touch-sensitive surface 606. In some examples, one or more auxiliary electrodes 608 are disposed in one column at a different angle non-parallel to touch-sensitive surface 606 compared to another column of one or more auxiliary electrodes 608 (e.g., based on the angle of available area of housing 616 for each column of one or more auxiliary electrodes 608). In some examples, auxiliary electrodes 608 are disposed in a pixelated configuration (e.g., the pixelated configuration does not include an arrangement of auxiliary electrodes 608 into rows and/or columns). In some examples, the arrangement of auxiliary electrodes 608 corresponds to the arrangement of touch-node electrodes 604 (e.g., if touch-node electrodes 604 are arranged in a row-column configuration, auxiliary electrodes 608 are arranged in a row-column configuration).

It should be appreciated that although two examples are shown in FIGS. 6A and 6B of an electronic device including at least two or at least four auxiliary electrodes 608, any number of auxiliary electrodes (e.g., at least one or at least three) and/or columns of auxiliary electrodes (e.g., greater than two) may be disposed at an angle non-parallel to touch-sensitive surface 606 and outside of first dimension 612 of touch-sensitive surface 606 (e.g., as reasonably integrated within the available space provided by the structural confines of housing 616) such that an improvement to the detection of touch and/or proximity activity relative to touch-sensitive surface 606 can be achieved. Although primarily illustrated as including auxiliary electrodes on both two, opposite sides of touch-sensitive surface 606, in some examples, electronic device 602 includes auxiliary electrodes 708 on one side of touch-sensitive surface 606. For example, one or more columns of one or more auxiliary electrodes 708 are disposed only under surface 610*a* or surface 610*b* (e.g., to improve detection of objects near one edge of touch-sensitive surface 606 where touch and/or proximity inputs are more frequent).

In some examples, auxiliary electrodes 608 support the touch-sensing system of electronic device 602 in detecting touch and/or proximity relative to touch-sensitive surface 606. Particularly, using the auxiliary electrodes 608, touch-sensing system can expand a region of detection of touch and/or proximity activity to extend outside of the physical area of touch-sensitive surface 606 (e.g., by detecting presence of an object, or a portion of an object, outside of edge 614*a* and/or 614*b* in proximity to auxiliary electrodes 608). In some examples, the dead-band error of the touch-sensing system (e.g., dead-band area 514 as shown and described with reference to FIG. 5A), can be reduced by detecting an object, or a portion of an object (e.g., object 504 as shown and described with reference to FIG. 5A) that has moved or is positioned outside of first dimension 612 of touch-sensitive surface 606. By expanding the range of detection of touch and/or proximity activity to outside of the area of touch-sensitive surface 606, an input provided by an object that is greater than, equal to, or within a threshold amount of first dimension 612 can be more accurately detected. In some examples, the detection of an object in proximity to edge 614*a* and/or 614*b* can be more accurately detected, as the presence of auxiliary electrodes 608 adjacent to edges 614*a* and 614*b* enable the touch-sensing system of electronic device 602 to sense the presence of an object outside of first dimension 612, thereby enabling a more accurate estimated centroid location of an input provided by the object relative to touch-sensitive surface 606.

FIG. 7A-7D illustrate a top-down view of examples of a touch-sensing system of an electronic device including one or more auxiliary electrodes, and a front-view of an input provided by an object on a touch-sensitive surface of the electronic device, according to examples of the disclosure. Particularly, FIG. 7A illustrates an example of a touch-sensing system of an electronic device including one or more elongated electrodes used to detect a location and/or movement of an object relative to a touch-sensitive surface, according to examples of the disclosure. FIG. 7B illustrates an example of a touch-sensing system of an electronic device including a plurality of auxiliary electrodes arranged in one or more columns used to detect a location and/or movement of an object relative to a touch-sensitive surface, according to examples of the disclosure. FIG. 7C illustrates an example of a touch-sensing system of an electronic device including one or more elongated auxiliary electrodes used to detect a location and/or movement of an object in proximity to an edge of a touch-sensitive surface, according to examples of the disclosure. FIG. 7D illustrates an example of a touch-sensing system of an electronic device including a plurality of auxiliary electrodes arranged in one or more columns used to detect a location and/or movement of an object in proximity to an edge of a touch-sensitive surface, according to examples of the disclosure.

As shown in FIGS. 7A-7D, a single column of auxiliary electrodes 708 are disposed outside and adjacent to edge 714*a* and 714*b* of touch-sensitive surface 706 (and outside of first dimension 712). However, it should be appreciated that more than one column of auxiliary electrodes 708 may be arranged on either side of touch-sensitive surface 706 (e.g., two columns are arranged of auxiliary electrodes 708 on either side of touch-sensitive surface 706, such as shown and described with reference to FIG. 6B). In some examples, auxiliary electrodes 708 may be of a different size (e.g., different lengths and/or widths) compared to touch-node electrodes 704 (e.g., two columns including a plurality of auxiliary electrodes 708 are included on either side of touch-sensitive surface 706, and each of the plurality of auxiliary electrodes 708 are a portion of the size (e.g., approximately half the size) of a touch-node electrode of the plurality of touch-node electrodes 704). It should be appreciated that although top-down view 728 shows a two-dimensional view of auxiliary electrodes 708 (such that they appear to be parallel with touch-node electrodes 704), auxiliary electrodes 708 are disposed at an angle non-parallel to touch-sensitive surface 706 (and non-parallel to touch-node electrodes 704), such as shown and described with reference to auxiliary electrodes 608 in FIGS. 6A and 6B. In some examples, a first column of one or more auxiliary electrodes 708 is disposed beneath a first surface 710*a* (shown in front-view 726) of a housing of electronic device 702, and a second column of one or more auxiliary electrodes 708 is disposed beneath a second surface 710*b* (shown in front-view 726) of a housing of electronic device 702. In some examples, first surface 710*a* and second surface 710*b* are curved and/or slanted surfaces (e.g., non-parallel surfaces to touch-sensitive surface 706) disposed on opposite sides of touch-sensitive surface 706.

FIGS. 7A-7D illustrates a front-view 726 of an object 724 providing an input (e.g., a touch-input) on touch-sensitive surface 706, and a top-down view 728 of a plurality of touch-node electrodes 704 disposed within first dimension 712 of touch-sensitive surface 706, and a plurality of auxiliary electrodes 708 disposed outside of first dimension 712 of touch-sensitive surface 706. In some examples, auxiliary electrodes 708 are disposed at an angle non-parallel to touch-sensitive surface 706 (e.g., such as shown and described with reference to FIGS. 6A and 6B). In some examples, auxiliary electrodes 708 are disposed along a second dimension of touch-sensitive surface 706 (e.g., the second dimension spans a direction normal to a direction that the first dimension 712 spans). As shown in FIGS. 7A and 7C, auxiliary electrodes 708 are elongated electrodes disposed outside of first dimension 712 of the touch-sensitive surface. Particularly, a first auxiliary electrode is disposed adjacent to edge 714*a* and outside of first dimension 712, and a second auxiliary electrode is disposed adjacent to edge 714*b* and outside of first dimension 712. As shown in FIGS. 7B and 7D, a plurality of auxiliary electrodes 708 are disposed in a column adjacent to edge 714*a* and outside of first dimension 712, and a plurality of auxiliary electrodes 708 are disposed in a column adjacent to edge 714*b* and outside of first dimension 712.

As shown in FIGS. 7A-7D, touch-node electrodes 704 and auxiliary electrodes 708 are optionally coupled to the same sensing circuitry (e.g., corresponding to touch controller 206 and/or sense channels 208). Particularly, each touch-node electrode of the plurality of touch-node electrodes 704 are coupled to first traces 738*a*, and each auxiliary electrode of the plurality of auxiliary electrodes 708 are coupled to second traces 738*b*. In some examples, traces 738*a* and 738*b* are conductive pathways formed from a conductive material (e.g., using transparent or non-transparent conductors such as copper or ITO). Touch-node electrodes 704 are coupled to the sensing circuitry of electronic device 702 (e.g., the sensing circuitry including touch controller 740) through first traces 738*a*, and auxiliary electrodes are coupled to the sensing circuitry of electronic device 702 through second traces 738*b*. In some examples, first traces 738*a* may be used to route signals (e.g., using a flexible circuit board) from touch-node electrodes 704 to touch controller 740. In some examples, second traces 738*b* may be used to route signals (e.g., using a flexible circuit board) from auxiliary electrodes 708 to touch controller 740. In some examples, touch controller 740 includes one or more characteristics of touch controller 206 shown and described with reference to FIG. 2. In some examples, touch controller 740 includes one or more sense channels to sense signals generated in first traces 738*a* and second traces 738*b* from touch-node electrodes 704 and auxiliary electrodes 708. As shown in FIGS. 7A-7D, touch controller 740 is coupled to touch processor 742. In some examples, touch processor 742 includes one or more characteristics of touch processor 202 shown and described with reference to FIG. 2. In some examples, touch processor 742 uses one or more signals received by touch controller 740 from touch-node electrodes 704 (e.g., through first traces 738*a*) and one or more signals received by touch controller 740 from auxiliary electrodes 708 (e.g., through second traces 738*b*) to detect a location and/or movement of object 724 (e.g., along first dimension 712) relative to touch-sensitive surface 706.

In some examples, touch processor 742 is configured to scale one or more signals received from touch-node electrodes 704 and/or auxiliary electrodes 708. For example, in the examples shown in FIGS. 7A and 7C where auxiliary electrodes 708 are elongated electrodes of a larger size than touch-node electrodes 704, the level of a signal received from an elongated auxiliary electrode may be higher compared to the level of a signal received from a touch-node electrode, and touch processor 742 is configured to scale the different signal levels received (e.g., based on information and/or instructions stored in a memory of electronic device 702) to accurately detect location and/or movement of object 724 relative to touch-sensitive surface 706. For example, in the examples shown in FIGS. 7B and 7D where a plurality of auxiliary electrodes 708 are arranged in columns on each side of touch-sensitive surface 706, and a single auxiliary electrode is optionally of a similar or smaller size compared to a single touch-node electrode, the level of a signal received by an auxiliary electrode may be less (e.g., due to the auxiliary electrode being disposed non-parallel relative to touch-sensitive surface 706 and/or the auxiliary electrode being of a smaller size compared to the touch-node electrode), and touch processor 742 is configured to scale the different signal levels received to accurately detect location and/or movement of object 724 relative to touch-sensitive surface 706. In some examples, scaling of the one or more signals received from touch-node electrodes 704 and/or auxiliary electrodes 708 is not necessary (e.g., when the electrode design allows for linearity across the touch-node electrodes 704 and auxiliary electrodes 708) for detecting touch and/or proximity activity of an object relative to touch-sensitive surface 706, and touch processor 742 does not scale the received one or more signals. In some examples, touch controller 740 includes a plurality of sense channels (e.g., corresponding to sense channels 208), and the sense channels can be tuned differently for detecting signal from auxiliary electrodes 708 compared with detecting signal from touch-node electrodes 704. For example, some sense channels are optionally tuned for detecting signals with relatively lower signal levels (e.g., from auxiliary electrodes 708 having similar dimensions to touch node electrodes 704), and one or more sense channels for detecting signals with relatively higher signal levels (e.g., from touch-node electrodes 704). In some examples, some sense channels are optionally tuned for detecting signals with relatively higher signal levels (e.g., from elongated auxiliary electrodes 708 with larger dimensions than touch node electrodes 704), and one or more sense channels for detecting signals with relatively lower signal levels (e.g., from touch-node electrodes 704).

In some examples, various sensing methods can be used by electronic device 702 to use auxiliary electrodes 708 and touch-node electrodes 704 to detect the input provided by object 724 relative to touch-sensitive surface 706. In some examples, the touch-sensing system of electronic device 702 can sense one column (e.g., along the second dimension of touch-sensitive surface 706) or row (e.g., along first dimension 712 of touch-sensitive surface 706) of either auxiliary electrodes 708 and/or touch-node electrodes 704 at a time (e.g., by grounding auxiliary electrodes 708 and/or touch-node electrodes 704 not included in the sensed column or row). In some examples, one or more touch-node electrodes 704 may be driven with the same potential as one or more auxiliary electrodes 708 (e.g., using a bootstrapping technique) to avoid deficiencies in the detection of touch and/or proximity activity caused by parasitic capacitance. It should be appreciated that because auxiliary electrodes 708 are coupled to the same sensing circuitry as touch-node electrodes 704, the same sensing technique can be deployed by the touch-sensing system of electronic device 702 utilizing both auxiliary electrodes 708 and touch-node electrodes 704. In some examples, the sensing technique can include any combination and/or pattern of driving, sensing and/or grounding different portions of touch-node electrodes 704 and/or auxiliary electrodes 708.

In some examples, the one or more signals received by touch processor 742 from the plurality of touch-node electrodes 704 and the plurality of auxiliary electrodes 708 are selectively used by touch processor 742 in determining proximity and/or movement of an object (e.g., object 724) relative to touch-sensitive surface 706. In some examples, touch processor 742 utilizes the one or more signals received by the plurality of auxiliary electrodes 708 for a determination of position detection of an object along the first dimension or movement of an object relative to touch-sensitive surface 706 along the first dimension. For example, in the examples of electronic device 702 shown in FIGS. 7A and 7C that include a single auxiliary electrode 708 on opposite sides of touch-sensitive surface 706, touch processor 742 optionally utilizes the one or more signals received by auxiliary electrodes 708 only for position detection or movement of object 724 along the horizontal axis of to touch-sensitive surface 706 (e.g., an x-axis coordinate), whereas touch processor 742 does not utilize the one or more signals received by auxiliary electrodes 708 for position detection or movement of object 724 along the vertical axis of to touch-sensitive surface 706 (e.g., y-axis coordinate) Instead, touch processor 742 utilizes the only the one or more signals received by the plurality of touch-node electrodes 704 to detect the vertical axis position/movement). Similarly, in the examples of electronic device 702 shown in FIGS. 7B and 7D that include a plurality of auxiliary electrodes 708 on opposite side of touch-sensitive surface 706, touch processor 742 optionally utilizes the one or more signals received by auxiliary electrodes 708 for both position and/or movement of object 724 relative to the first dimension of the touch-sensitive surface 706, but not for the position and/or movement of object 724 relative to the second dimension (e.g., auxiliary electrodes and touch-node electrodes are used for determining the horizontal axis coordinate of the object, whereas touch-node electrodes without auxiliary electrodes are used for determining the vertical axis coordinate of the object).

In some examples, object 724 includes one or more characteristics of objects 504 and/or 536 as shown and described with reference to FIGS. 5A and 5B and not repeated here for brevity. As shown in FIGS. 7A-7D, object 724 includes a first dimension 732. In some examples, first dimension 732 includes one or more characteristics of first dimension 530 as shown and described with reference to FIG. 5A and not repeated here for brevity. In some examples, first dimension 732 of object 724 is within a threshold amount (e.g., ±1 mm, ±2 mm, or ±5 mm) of first dimension 712 of touch-sensitive surface 706. In some examples, first dimension 712 illustrated in the example of electronic device 702 in FIGS. 7A-7B is different in length compared to first dimension 712 illustrated in the example of electronic device 702 in FIGS. 7C-7D. In some examples, FIGS. 7A and 7B include a first dimension 732 that is equal to or larger than first dimension 712. In some examples, FIGS. 7C and 7D include a first dimension 732 that is less than first dimension 712 (e.g., the example of first dimension 712 of touch-sensitive surface 706 as illustrated in FIGS. 7C and 7D is larger than the example of first dimension 712 of touch-sensitive surface 706 as illustrated in FIGS. 7A and 7B). It should be appreciated that although FIGS. 7C and 7D illustrate detection of an input provided by object 724 in proximity to an edge of touch-sensitive surface 706 using auxiliary electrodes 708, in other examples involving the example of electronic device 702 illustrated in FIGS. 7A-7B, an input provided by object 724 may be detected in proximity to an edge of touch-sensitive surface 706 using auxiliary electrodes 708.

As shown in FIGS. 7A-7B, the input provided by object 724, includes movement (represented by the solid and dashed-line representations of object 724 in front-view 726). Particularly, object 724 includes a first position 730*a* and a second position 730*b* relative to touch-sensitive surface 706. For example, movement of object 724 from position 730*a* to position 730*b* includes one or more characteristics of movement of object 504 from first position 522*a* to second position 522*b* as shown and described with reference to FIG. 5A and not repeated here for brevity. In some examples, movement of object 724 can span less than first dimension 712. For example, movement of object 724 includes movement (e.g., in a horizontal direction and/or in a direction parallel to first dimension 712) from a region of touch-sensitive surface 706 between first edge 714*a* and second edge 714*b*, to another region of touch-sensitive surface 706 between first edge 714*a* and second edge 714*b*. In some examples, movement of object 724 includes movement from a region of touch-sensitive surface 706 between first edge 714*a* and second edge 714*b* to first edge 714*a* or second edge 714*b*. In some examples, movement of object 724 may be in a direction normal to the direction of first dimension 712 (e.g., in a direction parallel to first edge 714*a* and second edge 714*b*). Due to the presence of auxiliary electrodes 708 on either side and outside of first dimension 712 of touch-sensitive surface 706, the input provided by object 724 can be more accurately sensed despite object 724 including a first dimension 732 that is greater than, equal to, or within a threshold amount of first dimension 712. As shown in FIGS. 7A-7B, the touch-sensing system of electronic device 702 includes a reduced dead-band area 734 (e.g., compared to dead-band area 514 as shown and described with reference to FIG. 5A) because the presence of auxiliary electrodes 708 enables the detection of movement of object 724 (e.g., and movement of a centroid of the input) compared to as shown and described with reference to FIG. 5A. Accordingly, touch-sensitive surface 706 includes a smaller region in which an input would cause all electrodes of at least a row and/or column of the touch-sensing system to be saturated, thereby improving accuracy of detection of movement of a centroid. In some examples, touch processor 742 uses one or more signals from touch-node electrodes 704 and one or more signals from auxiliary electrodes 708 to determine a location and/or movement of object 724 relative to touch-sensitive surface 706. As shown in FIGS. 7A-7B, a first estimated centroid 736*a* is determined relative to position 730*a* of object 724, and a second estimated centroid 736*b* is determined relative to position 730*b* of object 724 (e.g., due to the reduced size of dead-band area 734).

As shown in FIGS. 7C and 7D, an input provided by object 724 on touch-sensitive surface 706 includes a position 746 of object 724 relative to touch-sensitive surface 706 that includes an area of object 724 on either side of edge 714*a* of touch-sensitive surface 706 (e.g., a portion of object 724 is within first dimension 712 of touch-sensitive surface 706, and a portion of object 724 is outside of first dimension 712 of touch-sensitive surface 706). In some examples, the location of object 724 (e.g., as defined by the actual centroid of the input provided by object 724) is within a threshold distance of edge 714*a* (e.g., within 5 mm). Due to the presence of auxiliary electrodes 708 on either side and outside of first dimension 712 of touch-sensitive surface 706, the input of object 724 can be more accurately sensed despite the input provided by object 724 including a location close to edge 714*a*. Accordingly, as shown in FIGS. 7C and 7D, the touch-sensing system of electronic device includes a reduced sense detection error 750 (e.g., compared to sense detection error 614 as shown and described with reference to FIG. 5B). In some examples, touch processor 742 uses one or more signals from touch-node electrodes 704 and from auxiliary electrodes 708 to determine the location of object 724 relative to touch-sensitive surface 706. As shown in FIGS. 7C-7D, an estimated centroid 748 is determined more accurately (e.g., compared to estimated centroid 542 show and described with reference to FIG. 5B) relative to position 746 of object 724 (e.g., due to the ability to capacitively sense the area of object 724 outside of first dimension 712).

FIG. 8 illustrates an exemplary method for detecting an input provided by an object relative to a first surface of an electronic device, according to examples of the disclosure. In some examples, exemplary method 800 is performed at an electronic device (e.g., electronic device 602 as shown and described with reference to FIGS. 6A-6B and electronic device 702 as shown and described with reference to FIGS. 7A-7D). In some examples, exemplary method 800 is performed after an object (e.g., object 724) including a first dimension (e.g., first dimension 732) of 10-30 mm provides an input on a first surface (e.g., touch-sensitive surface 706) that includes a first dimension (e.g., first dimension 712) of less than 25 mm corresponding to movement along the first dimension of the first surface. In some examples, the movement along the first dimension of the first surface includes movement from or between a first edge (e.g., first edge 714*a*) and a second edge (e.g., second edge 714*b*) of the first surface. In some examples, the movement corresponds to a horizontal swipe input relative to the first surface. In some examples, the input corresponds to a touch input and/or a proximity input relative to the first surface. In method 800, at 802, a touch controller (e.g., touch controller 740) receives one or more signals from a plurality of touch-node electrodes (e.g., touch-node electrodes 704) disposed beneath and parallel to the first surface, and one or more signals from a plurality of auxiliary electrodes (e.g., auxiliary electrodes 708) disposed outside of first surface and non-parallel to first surface. In some examples, the one or more signals are routed from the plurality of touch-node electrodes to the touch controller through first traces (e.g., traces 738*a*). In some examples, the one or more signals are routed from the plurality of auxiliary electrodes to the touch controller through second traces (e.g., traces 738*b*). In some examples, each of the plurality of auxiliary electrodes is disposed at an angle between 30-60 degrees relative to a plane parallel to the first surface. At 804, a touch processor (e.g., touch processor 742) detects the movement of the object relative to the first surface along the first dimension based on the one or more signals received from the plurality of touch-node electrodes and the one or more signals received from the plurality of auxiliary electrodes. In some examples, the touch processor is in communication with the touch controller and utilizes information and/or instructions stored in a memory of the electronic device.

Figure 9:
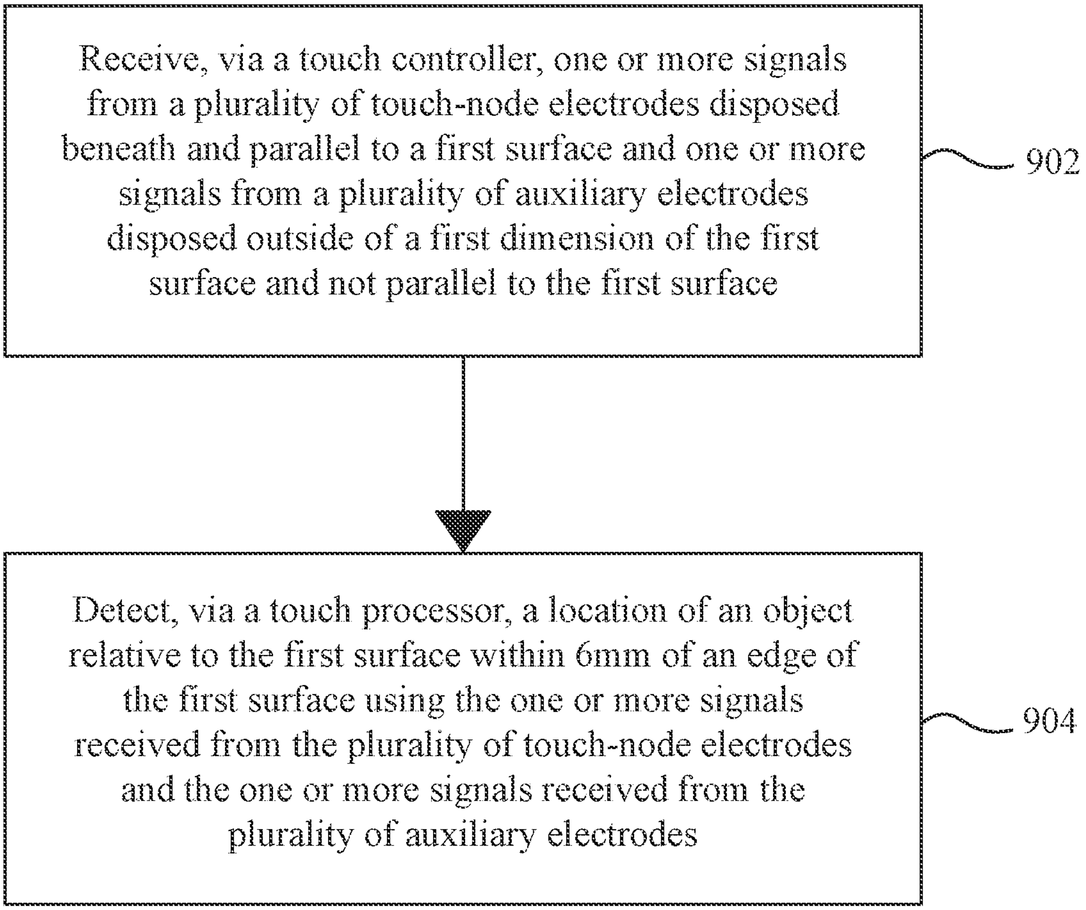
FIG. 9 illustrates an exemplary method for detecting an input provided by an object relative to a first surface of an electronic device, according to examples of the disclosure.

FIG. 9 illustrates an exemplary method for detecting an input provided by an object relative to a first surface of an electronic device, according to examples of the disclosure. In some examples, exemplary method 900 is performed at an electronic device (e.g., electronic device 602 as shown and described with reference to FIGS. 6A-6B and electronic device 702 as shown and described with reference to FIGS. 7A-7D). In some examples, exemplary method 900 is performed after an object (e.g., object 724) provides an input within 5 mm of an edge (e.g., edge 714*a* or edge 714*b*) of a first surface (e.g., touch-sensitive surface 706), the first surface including a first dimension (e.g., first dimension 712). In some examples, the input includes placement of the object over the edge of the first surface (e.g., a first portion of the object is outside of the first dimension of the first surface, and a second portion of the object is within the first dimension of the first surface). In some examples, the input includes movement of the object over the edge of the first surface (e.g., movement of the object includes movement starting from within the first dimension of the first surface to outside the first dimension of the first surface). In some examples, the input corresponds to a touch input and/or a proximity input relative to the first surface. In method 900, at 902, a touch controller (e.g., touch controller 740) receives one or more signals from a plurality of touch-node electrodes (e.g., touch-node electrodes 704) disposed beneath and parallel to the first surface, and one or more signals from a plurality of auxiliary electrodes (e.g., auxiliary electrodes 708) disposed outside of the first dimension of the first surface and non-parallel to the first surface. In some examples, the one or more signals are routed from the plurality of touch-node electrodes to the touch controller through first traces. In some examples, the one or more signals are routed from the plurality of auxiliary electrodes to the touch controller through second traces. In some examples, the plurality of auxiliary electrodes are disposed at an angle of 30-60 degrees relative to a plane parallel to the first surface. At 904, a touch processor (e.g., touch processor 742) detects a location of the object relative to the first surface within 5 mm of the edge of the first surface using the one or more signals received from the plurality of touch-node electrodes and the one or more signals received from the plurality of auxiliary electrodes. In some examples, the touch processor is in communication with the touch controller and utilizes information and/or instructions stored in a memory of the electronic device.

Therefore, according to the above, some examples of the disclosure are directed to an electronic device comprising a housing comprising a first surface with a first dimension, a plurality of touch-node electrodes disposed beneath and parallel to the first surface, and a plurality of auxiliary electrodes disposed outside of the first dimension of the first surface and non-parallel to the first surface. In some examples, the electronic device is configured to detect an input corresponding to movement of an object relative to the first surface using one or more signals from the plurality of touch-node electrodes and one or more signals from the plurality of auxiliary electrodes.

Additionally, or alternatively, in some examples, the electronic device further comprises a processor configured to detect a location of the object relative to the first surface and the movement of the object along the first dimension relative to the first surface using the one or more signals from the plurality of touch-node electrodes and the one or more signals from the plurality of auxiliary electrodes.

Additionally, or alternatively, in some examples, the location of the input relative to the first surface is within a threshold distance of an edge of the first surface.

Additionally, or alternatively, in some examples, movement of the object relative to the first surface includes a swipe of the object along the first dimension of the first surface.

Additionally, or alternatively, in some examples, the plurality of auxiliary electrodes includes a first auxiliary electrode disposed on a first side of the first surface, and a second auxiliary electrode disposed on a second side of the first surface, opposite from the first side of the first surface.

Additionally, or alternatively, in some examples, the plurality of touch-node electrodes includes a first row of touch-node electrodes disposed between the first auxiliary electrode and the second auxiliary electrode, and a second row of touch-node electrodes disposed between a third auxiliary electrode on the first side of the first surface and a fourth auxiliary electrode on the second side of the first surface.

Additionally, or alternatively, in some examples, each of the plurality of auxiliary electrodes is disposed at an angle ranging from 30 to 60 degrees relative to a plane parallel to the first surface.

Additionally, or alternatively, in some examples, the movement of the object relative to the first surface includes the object moving along the first dimension of the first surface from a first edge of the first surface to a second edge of the first surface.

Additionally, or alternatively, in some examples, the first dimension of the first surface is less than 25 mm.

Additionally, or alternatively, in some examples, the object includes a first dimension larger than the first dimension of the first surface.

Additionally, or alternatively, in some examples, wherein the first dimension of the object is 10-30 mm.

Additionally, or alternatively, in some examples, the plurality of auxiliary electrodes operates as self-capacitance electrodes.

Additionally, or alternatively, in some examples, the plurality of auxiliary electrodes operates as mutual capacitance electrodes.

Additionally, or alternatively, in some examples, the electronic device further comprises first traces coupling the plurality of touch-node electrodes to sensing circuitry and second traces coupling the plurality of auxiliary electrodes to the sensing circuitry.

Some examples of the disclosure are directed to an electronic device comprising a first surface with a first dimension less than 25 mm, a plurality of touch-node electrodes disposed beneath and parallel to the first surface, and a plurality of auxiliary electrodes disposed outside of the first dimension of the first surface and non-parallel to the first surface. In some examples, the electronic device is configured to detect an input corresponding to movement of an object in a first direction corresponding to the first dimension relative to the first surface using one or more signals from the plurality of touch-node electrodes and one or more signals from the plurality of auxiliary electrodes.

Additionally, or alternatively, in some examples, the electronic device further comprises a processor configured to detect a location of the object relative to the first surface and the movement of the object in the first direction relative to the first surface using the one or more signals from the plurality of touch-node electrodes and the one or more signals from the plurality of auxiliary electrodes.

Additionally, or alternatively, in some examples, the location of the input relative to the first surface is within a threshold distance of an edge of the first surface.

Additionally, or alternatively, in some examples, the movement of the object in the first direction relative to the first surface includes a swipe of the object along the first dimension of the first surface.

Additionally, or alternatively, in some examples, the plurality of auxiliary electrodes includes a first auxiliary electrode disposed on a first side of the first surface, and a second auxiliary electrode disposed on a second side of the first surface, opposite from the first side of the first surface.

Additionally, or alternatively, in some examples, the plurality of touch-node electrodes includes a first row of touch-node electrodes disposed between the first auxiliary electrode and the second auxiliary electrode, and a second row of touch-node electrodes disposed between a third auxiliary electrode on the first side of the first surface and a fourth auxiliary electrode on the second side of the first surface.

Additionally, or alternatively, in some examples, each of the plurality of auxiliary electrodes is disposed at an angle ranging from 30 to 60 degrees relative to a plane parallel to the first surface.

Additionally, or alternatively, in some examples, the movement of the object relative to the first surface includes the object moving along the first dimension of the first surface from a first edge of the first surface to a second edge of the first surface.

Additionally, or alternatively, in some examples, the object includes a first dimension larger than the first dimension of the first surface.

Additionally, or alternatively, in some examples, the first dimension of the object is 10-30 mm.

Additionally, or alternatively, in some examples, the plurality of auxiliary electrodes operates as self-capacitance electrodes.

Additionally, or alternatively, in some examples, the plurality of auxiliary electrodes operates as mutual capacitance electrodes.

Additionally, or alternatively, in some examples, the electronic device further comprises first traces coupling the plurality of touch-node electrodes to sensing circuitry and second traces coupling the plurality of auxiliary electrodes to the sensing circuitry.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. An electronic device comprising:

a housing comprising a first surface with a first dimension;

a plurality of touch-node electrodes disposed beneath the first surface, wherein the plurality of touch-node electrodes extends along a first plane that is parallel to the first surface; and a plurality of auxiliary electrodes disposed outside of the first dimension of the first surface, wherein at least a first electrode of the plurality of auxiliary electrodes extends along a second plane that is non-parallel to the first surface;

wherein the electronic device is configured to detect an input corresponding to movement of an object relative to the first dimension of the first surface using one or more signals from the plurality of touch-node electrodes and one or more signals from the plurality of auxiliary electrodes, including a first signal from a first auxiliary electrode that extends along the second plane that is non-parallel to the first surface.

2. The electronic device of claim 1, further comprising a processor configured to detect a location of the object relative to the first surface and the movement of the object along the first dimension relative to the first surface using the one or more signals from the plurality of touch-node electrodes and the one or more signals from the plurality of auxiliary electrodes.

3. The electronic device of claim 2, wherein the location of the input relative to the first surface is within a threshold distance of an edge of the first surface.

4. The electronic device of claim 1, wherein movement of the object relative to the first surface includes a swipe of the object along the first dimension of the first surface.

5. The electronic device of claim 1, wherein the plurality of auxiliary electrodes includes a first auxiliary electrode disposed on a first side of the first surface, and a second auxiliary electrode disposed on a second side of the first surface, opposite from the first side of the first surface.

6. The electronic device of claim 5, wherein the plurality of touch-node electrodes includes a first row of touch-node electrodes disposed between the first auxiliary electrode and the second auxiliary electrode, and a second row of touch-node electrodes disposed between a third auxiliary electrode on the first side of the first surface and a fourth auxiliary electrode on the second side of the first surface.

7. The electronic device of claim 1, wherein each of the plurality of auxiliary electrodes is disposed at an angle ranging from 30 to 60 degrees relative to the first plane parallel to the first surface.

8. The electronic device of claim 1, wherein the object includes a first dimension larger than the first dimension of the first surface.

9. The electronic device of claim 1, further comprising:

first traces coupling the plurality of touch-node electrodes to sensing circuitry; and second traces coupling the plurality of auxiliary electrodes to the sensing circuitry.

10. An electronic device comprising:

a housing comprising a first surface with a first dimension less than 25 mm;

a plurality of touch-node electrodes disposed beneath the first surface, wherein the plurality of touch-node electrodes extends along a first plane that is parallel to the first surface; and a plurality of auxiliary electrodes disposed outside of the first dimension of the first surface, wherein at least a first electrode of the plurality of auxiliary electrodes extends along a second plane that is non-parallel to the first surface;

wherein the electronic device is configured to detect an input corresponding to movement of an object in a first direction corresponding to the first dimension relative to the first dimension of the first surface using one or more signals from the plurality of touch-node electrodes and one or more signals from the plurality of auxiliary electrodes, including a first signal from a first auxiliary electrode that extends along the second plane that is non-parallel to the first surface.

11. The electronic device of claim 10, further comprising a processor configured to detect a location of the object relative to the first surface and the movement of the object in the first direction relative to the first surface using the one or more signals from the plurality of touch-node electrodes and the one or more signals from the plurality of auxiliary electrodes.

12. The electronic device of claim 10, wherein the movement of the object in the first direction relative to the first surface includes a swipe of the object along the first dimension of the first surface.

13. The electronic device of claim 10, wherein the plurality of auxiliary electrodes includes a first auxiliary electrode disposed on a first side of the first surface, and a second auxiliary electrode disposed on a second side of the first surface, opposite from the first side of the first surface.

14. The electronic device of claim 13, wherein the plurality of touch-node electrodes includes a first row of touch-node electrodes disposed between the first auxiliary electrode and the second auxiliary electrode, and a second row of touch-node electrodes disposed between a third auxiliary electrode on the first side of the first surface and a fourth auxiliary electrode on the second side of the first surface.

15. The electronic device of claim 10, wherein each of the plurality of auxiliary electrodes is disposed at an angle ranging from 30 to 60 degrees relative to the first plane parallel to the first surface.

16. The electronic device of claim 10, wherein the movement of the object relative to the first surface includes the object moving along the first dimension of the first surface from a first edge of the first surface to a second edge of the first surface.

17. The electronic device of claim 10, wherein the object includes a first dimension larger than the first dimension of the first surface.

18. The electronic device of any of claim 10, wherein the plurality of auxiliary electrodes operates as self-capacitance electrodes.

19. The electronic device of claim 10, wherein the plurality of auxiliary electrodes operates as mutual capacitance electrodes.

20. The electronic device of claim 10, further comprising:

first traces coupling the plurality of touch-node electrodes coupled to sensing circuitry; and second traces coupling the plurality of auxiliary electrodes coupled to the sensing circuitry.

* * * * *